F. L. FULLER.
REGISTERING AND RECORDING MECHANISM.
APPLICATION FILED SEPT. 2, 1915.

1,311,884.

Patented Aug. 5, 1919.
15 SHEETS—SHEET 1.

Inventor
Frederick L. Fuller.
Attorneys

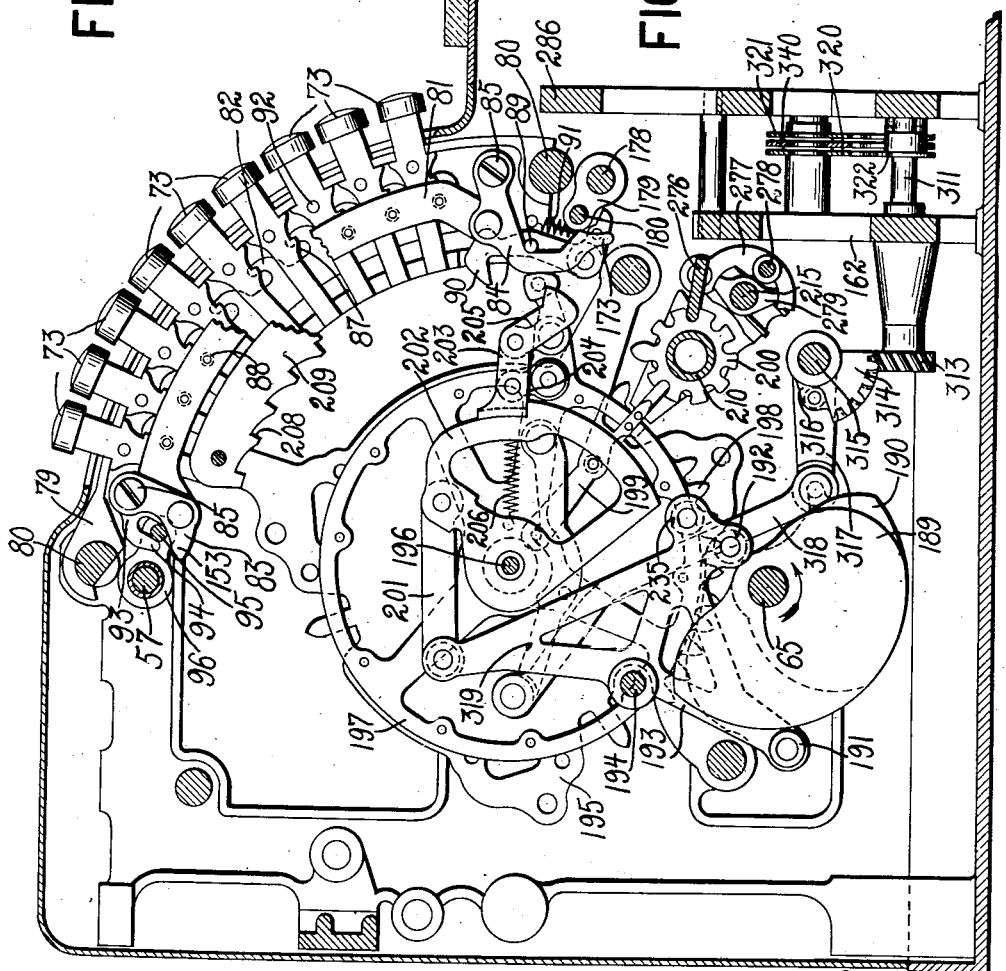

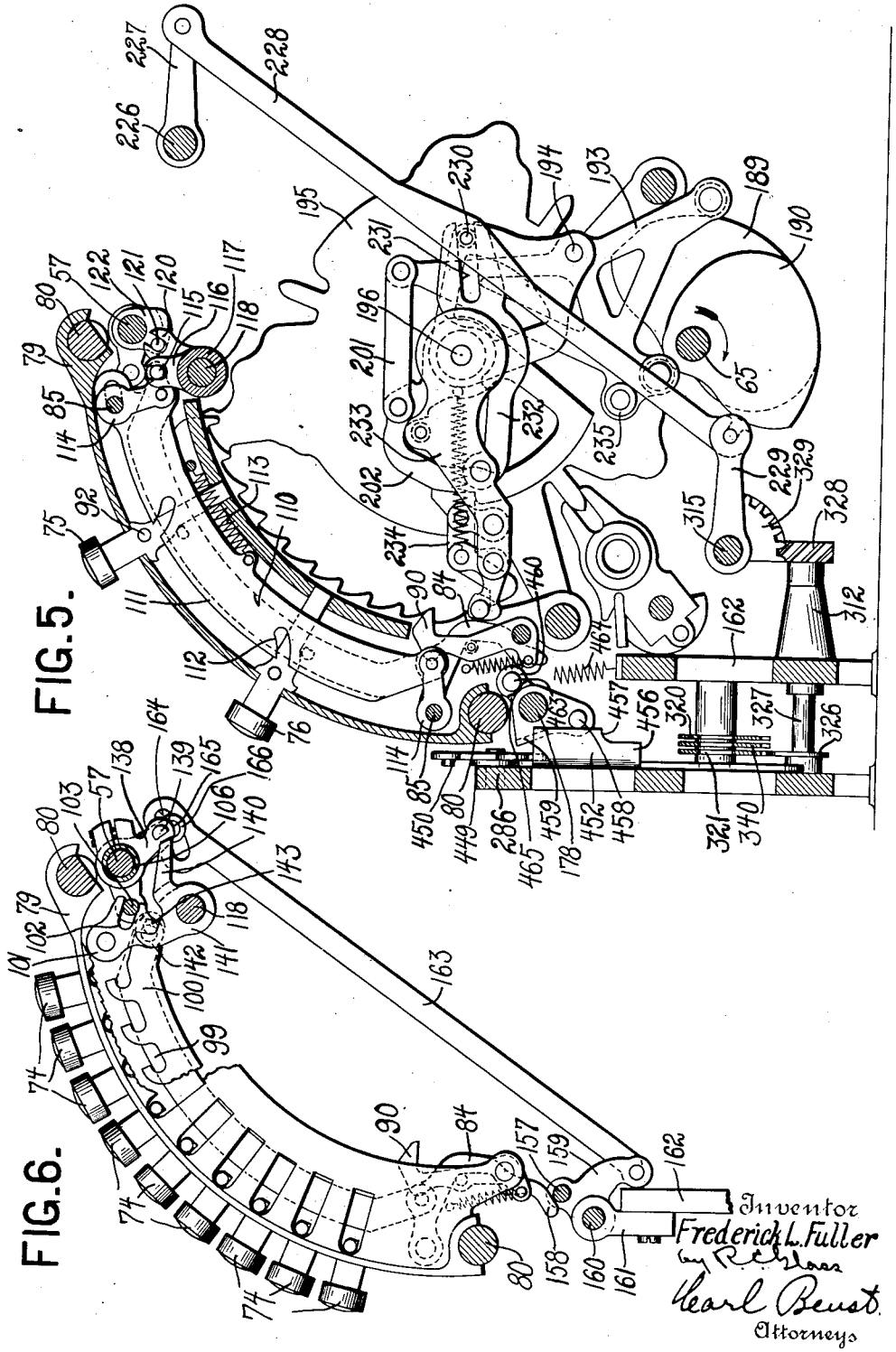

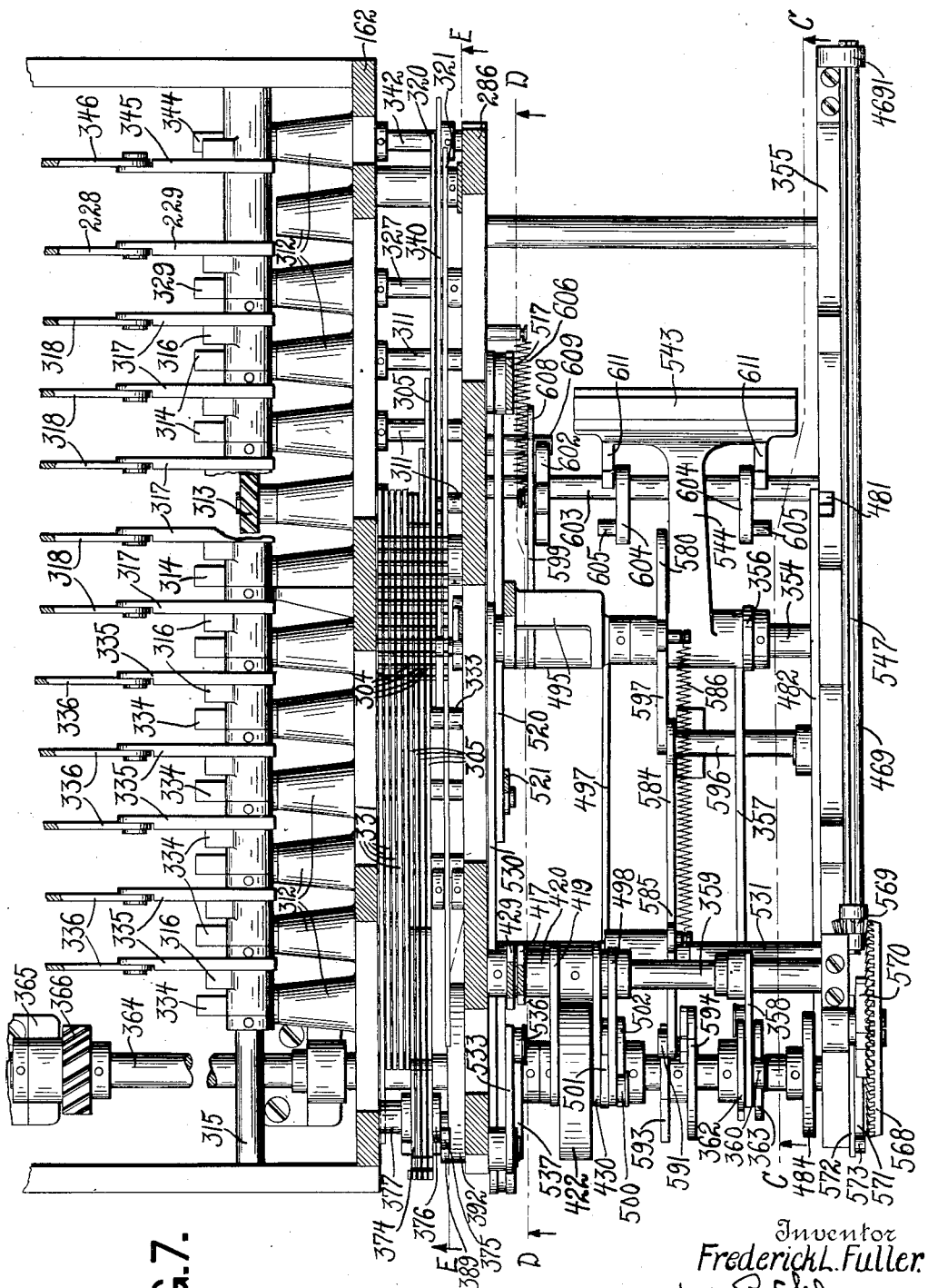

F. L. FULLER.
REGISTERING AND RECORDING MECHANISM.
APPLICATION FILED SEPT. 2, 1915.

1,311,884.

Patented Aug. 5, 1919.
15 SHEETS—SHEET 5.

Inventor
Frederick L. Fuller.
by
Attorneys

F. L. FULLER.
REGISTERING AND RECORDING MECHANISM.
APPLICATION FILED SEPT. 2, 1915.
1,311,884.
Patented Aug. 5, 1919.
15 SHEETS—SHEET 6.
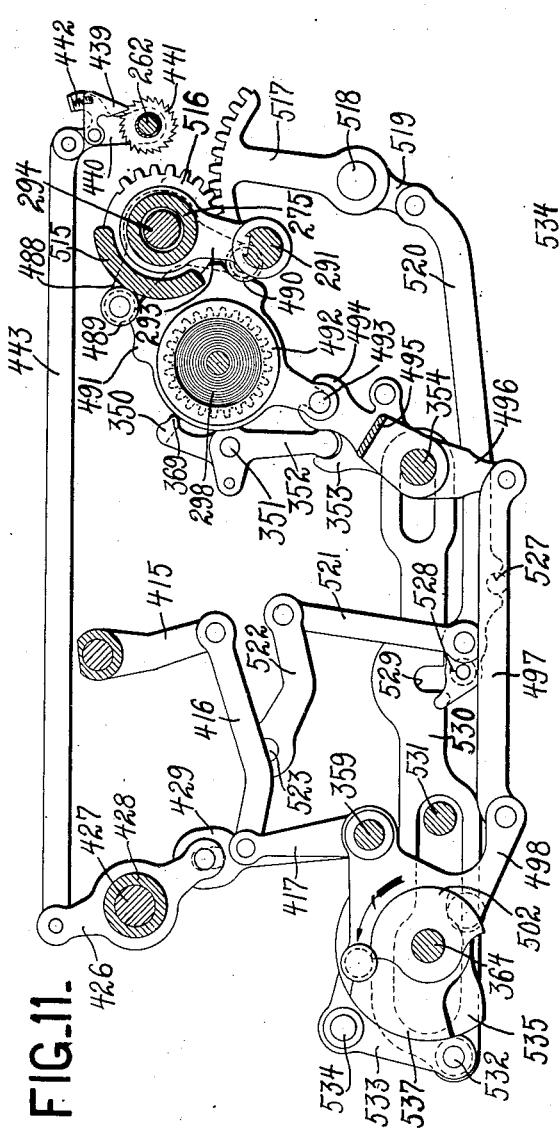
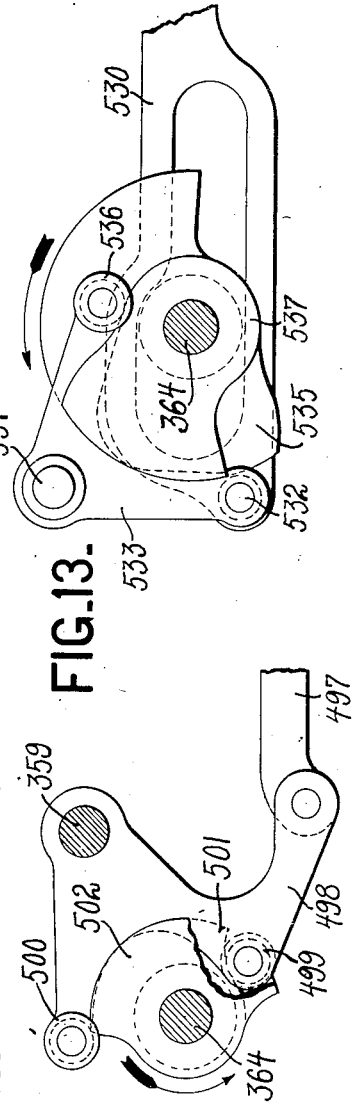
Inventor
Frederick L. Fuller.
Earl Beust
Attorneys

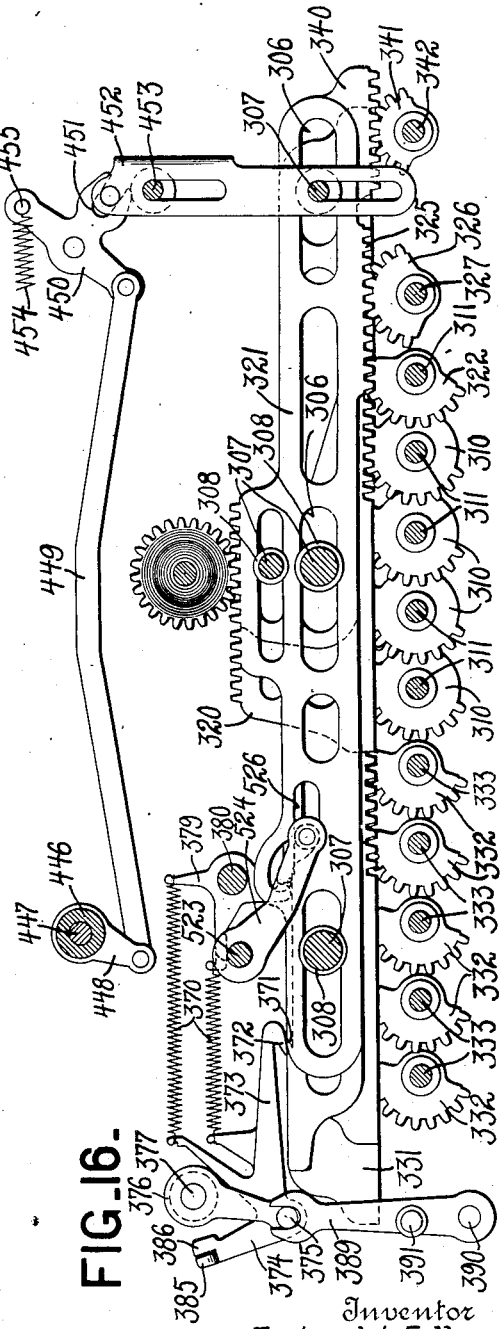
F. L. FULLER.
REGISTERING AND RECORDING MECHANISM.
APPLICATION FILED SEPT. 2, 1915.
1,311,884.
Patented Aug. 5, 1919.
15 SHEETS—SHEET 7.
Inventor
Frederick L. Fuller.
Attorneys

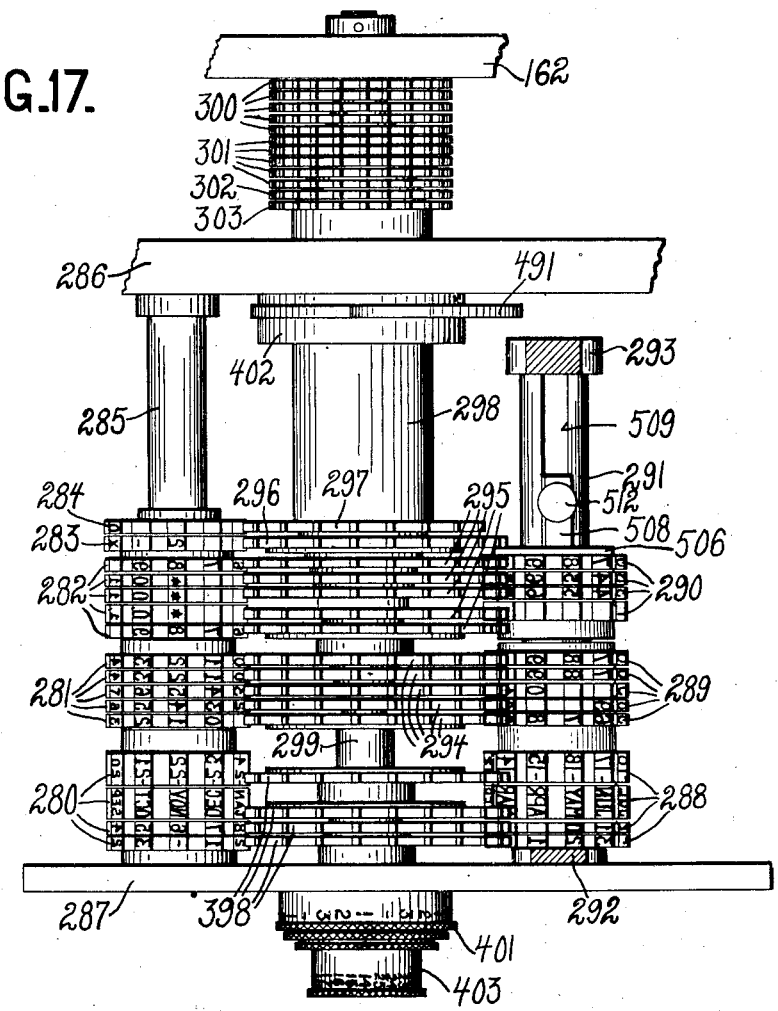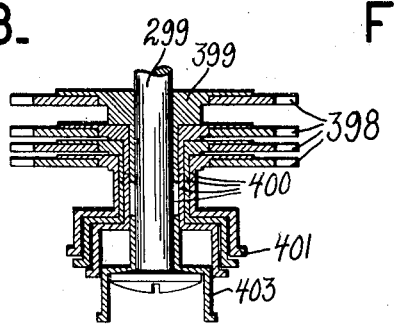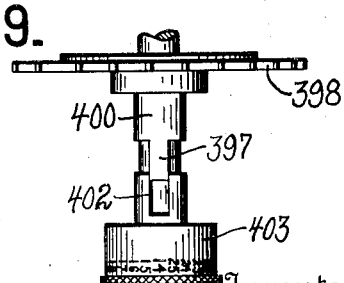

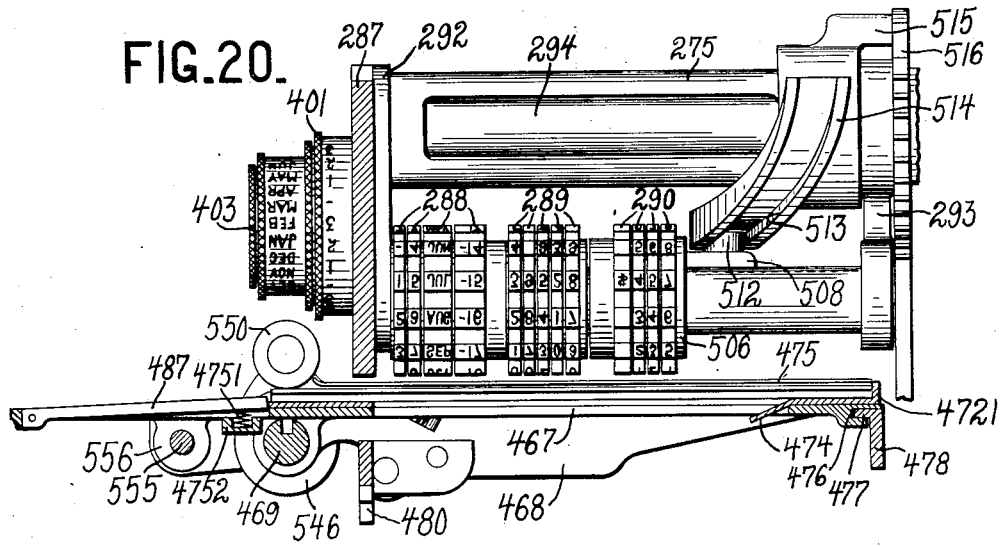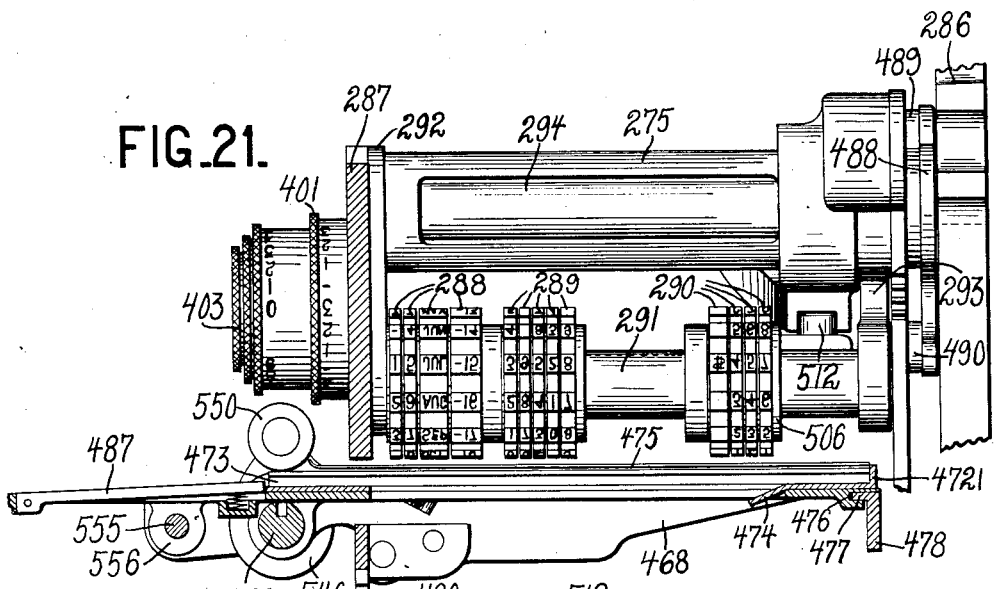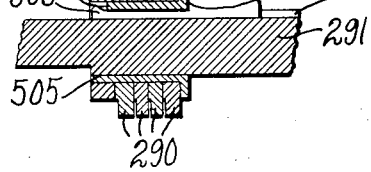

F. L. FULLER.
REGISTERING AND RECORDING MECHANISM.
APPLICATION FILED SEPT. 2, 1915.
FIG. 23.
| | | | |
|---|---|---|---|
| 22 SEP-14 | 00000 | $ * * * 0 | XW |
| 22 SEP-14 | 00000 | $ * * * 0 | XW |
| 22 SEP-14 | 00000 | $ * * * 0 | XD |
| 22 SEP-14 | 00000 | $ * * * 0 | XD |
| 22 SEP-14 | 00566 | $ * * 555 | -D |
| 22 SEP-14 | 00463 | $ * * 656 | -D |
| 22 SEP-14 | 00543 | $ * * 50 | -D |
| 22 SEP-14 | 44736 | $ * * 50 | -D |
| 22 SEP-14 | 53452 | $ * 236 | -D |
| 22 SEP-14 | 76542 | $ * * 40 | -W |
| 22 SEP-14 | 00574 | $ * * 87 | -W |
| 22 SEP-14 | 64326 | $ * * 83 | -D |
| 22 SEP-14 | 66255 | $ * 500 | -W |
| 22 SEP-14 | 74733 | $ * * 20 | -W |
| 22 SEP-14 | 25364 | $ * * 43 | -D |
| 22 SEP-14 | 66577 | $ * * 35 | -D |
| 22 SEP-14 | 65375 | $ * * 60 | -W |
| 22 SEP-14 | 05537 | $ * 640 | -D |
| 22 SEP-14 | 76444 | $ * * 77 | -D |
| 22 SEP-14 | 04365 | $ * * 50 | -D |
| 22 SEP-14 | 00000 | $ * * * 0 | XW |
| 22 SEP-14 | 00000 | $ * 757 | XW |
| 22 SEP-14 | 00000 | $ * * * 0 | XD |
| 22 SEP-14 | 00000 | $ 2,425 | XD |
| 22 SEP-14 | 05544 | $ * * 57 | -D |
| 22 SEP-14 | 55242 | $ * * 60 | -D |
| 22 SEP-14 | 66883 | $ * * 70 | -W |
| 22 SEP-14 | 44661 | $ * * 50 | -D |
| 22 SEP-14 | 00000 | $ * * * 0 | ZW |
| 22 SEP-14 | 00000 | $ * 827 | ZW |
| 22 SEP-14 | 00000 | $ * * * 0 | ZD |
| 22 SEP-14 | 00000 | $ 2,592 | ZD |
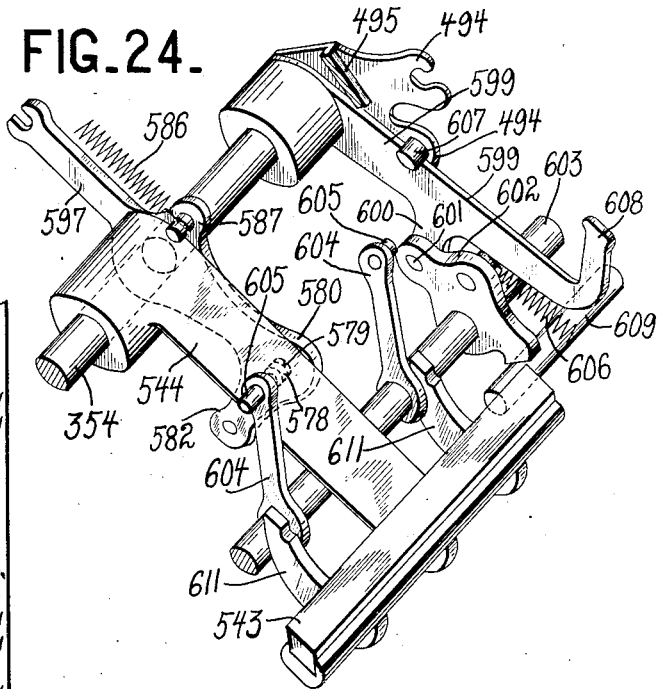
FIG. 24.
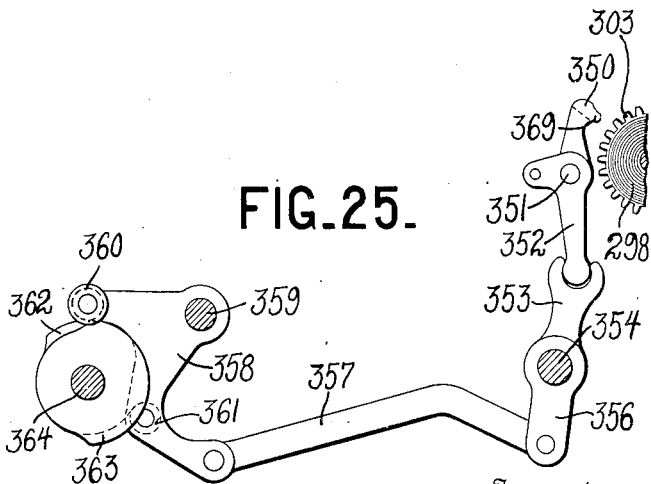
FIG. 25.
Inventor
Frederick L. Fuller
Attorneys F. L. FULLER.
REGISTERING AND RECORDING MECHANISM.
APPLICATION FILED SEPT. 2, 1915.

1,311,884.

Patented Aug. 5, 1919.
15 SHEETS—SHEET 11.

Inventor
Frederick L. Fuller.
by R. C. Mann
Earl Beust
Attorneys

F. L. FULLER.
REGISTERING AND RECORDING MECHANISM.
APPLICATION FILED SEPT. 2, 1915.

1,311,884.

Patented Aug. 5, 1919.
15 SHEETS—SHEET 12.

FIG. 30.

Page 2 — Mr. John Doe

| | Date | Depositor's No. | Deposited | Withdrawn | Balance |
|---|---|---|---|---|---|
| 1 | 28 APR-14 | 23425 | $ *30 | | |
| 2 | -5 MAY-14 | 23425 | $ 450 | | |
| 3 | -7 MAY-14 | 23425 | $ 425 | | |
| 4 | -8 MAY-14 | 23425 | $ **7 | | |
| 5 | 10 MAY-14 | 23425 | | $ *65 | |
| 6 | 11 MAY-14 | 23425 | $ *40 | | |
| 7 | 12 MAY-14 | 23425 | $ 235 | | |
| 8 | 16 MAY-14 | 23425 | $ *15 | | |
| 9 | 17 MAY-14 | 23425 | | $ ***8 | |
| 10 | 18 MAY-14 | 23425 | $ *25 | | |

FIG. 29.

Page 2 — Mr. John Doe

| | Date | Depositor's No. | Deposited | Withdrawn | Balance |
|---|---|---|---|---|---|
| 1 | 28 APR-14 | 23425 | $ *30 | | |
| 2 | -5 MAY-14 | 23425 | $ 450 | | |
| 3 | -7 MAY-14 | 23425 | $ 425 | | |
| 4 | -8 MAY-14 | 23425 | $ **7 | | |
| 5 | 10 MAY-14 | 23425 | | $ *65 | |
| 6 | 11 MAY-14 | 23425 | $ *40 | | |
| 7 | 12 MAY-14 | 23425 | $ 235 | | |
| 8 | 16 MAY-14 | 23425 | $ *15 | | |
| 9 | 17 MAY-14 | 23425 | | $ ***8 | |
| 10 | 18 MAY-14 | 23425 | $ *25 | | $1154 |

Inventor
Frederick L. Fuller.
by
Earl Benst
Attorneys

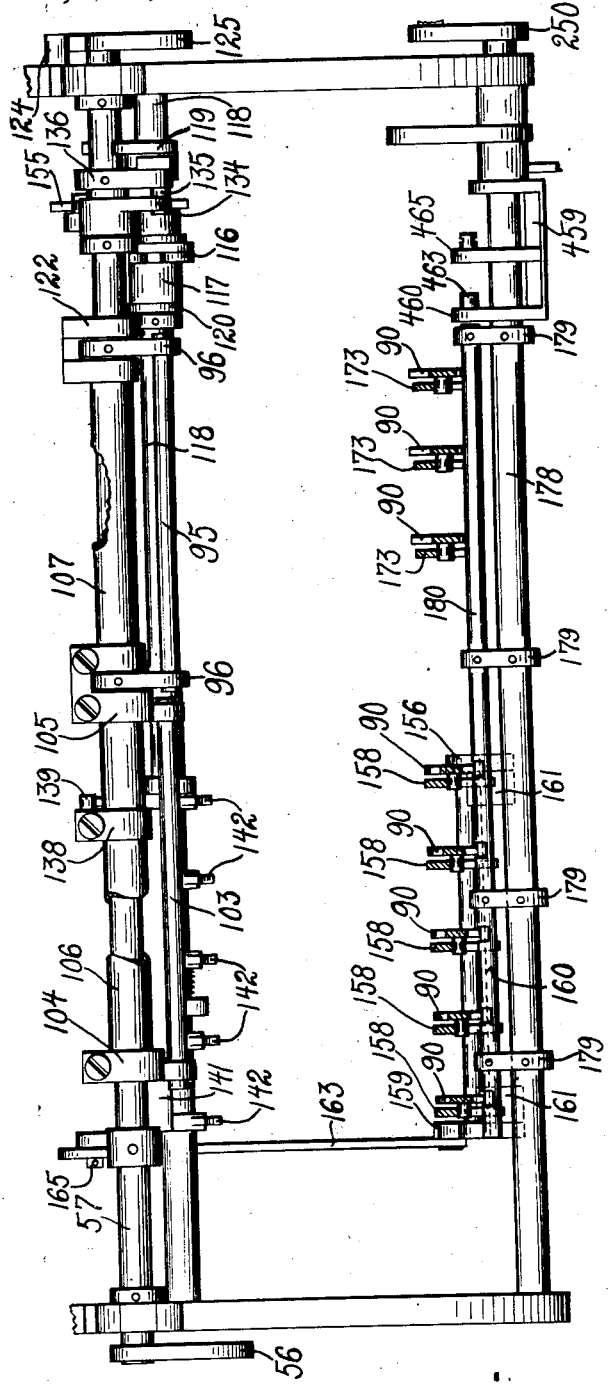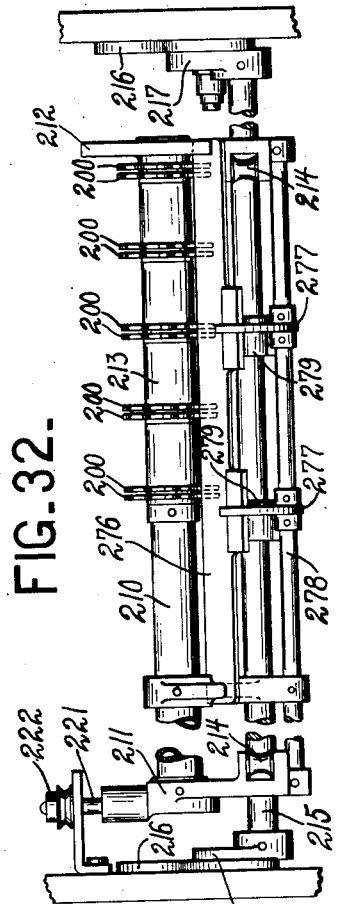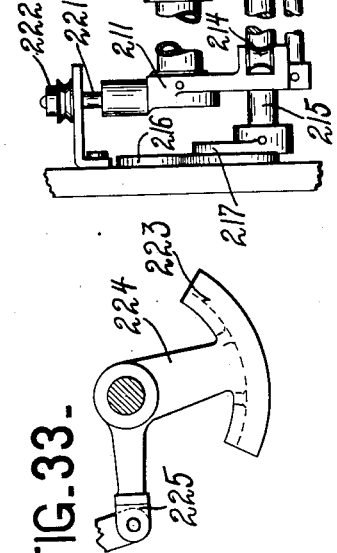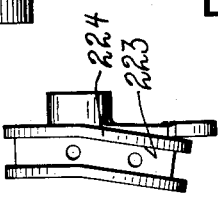

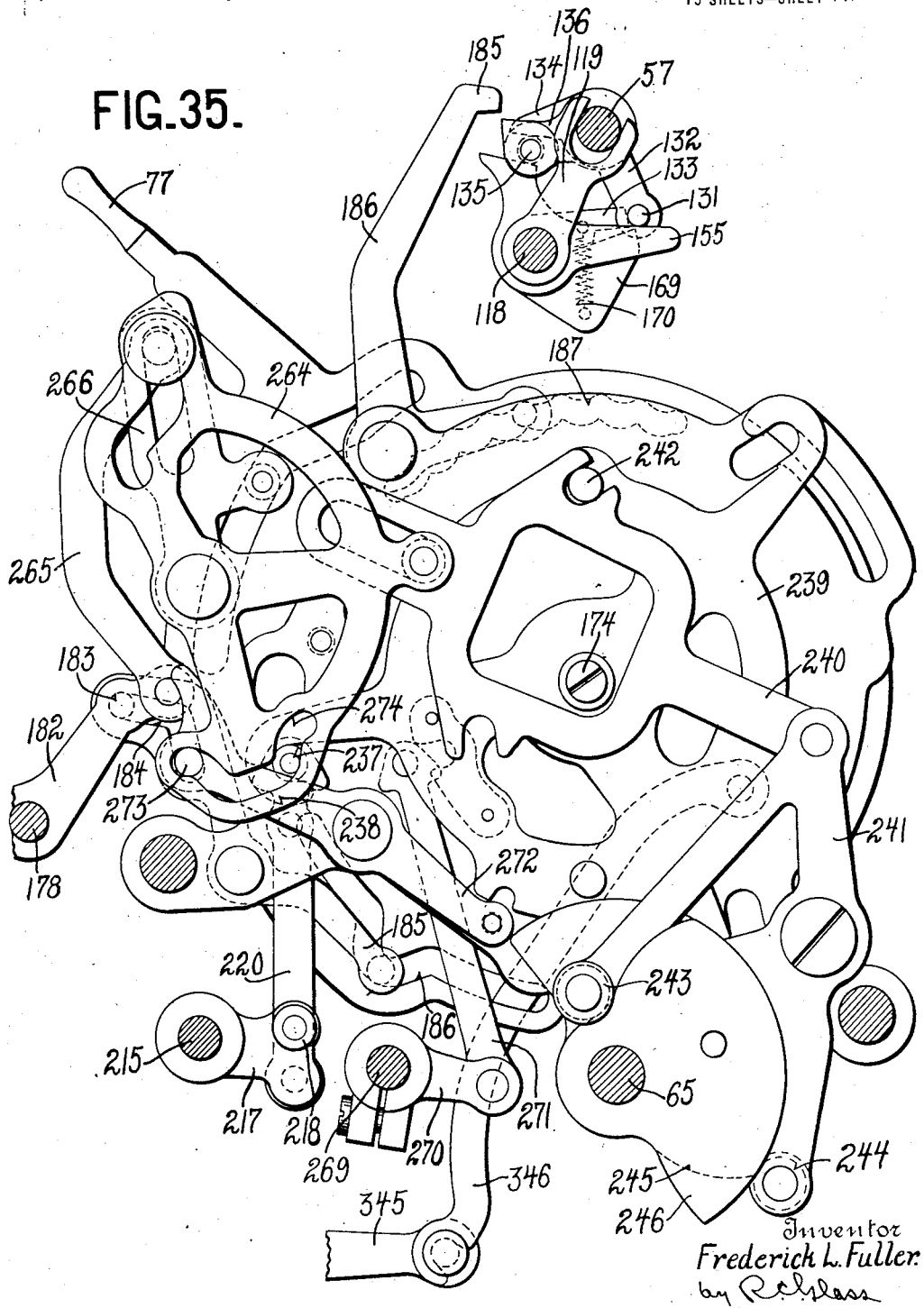

F. L. FULLER.
REGISTERING AND RECORDING MECHANISM.
APPLICATION FILED SEPT. 2, 1915.

1,311,884.

Patented Aug. 5, 1919.
15 SHEETS—SHEET 15.

Inventor
Frederich L. Fuller.
by R. Chlass
Carl Beust
Attorneys

UNITED STATES PATENT OFFICE.

FREDERICK L. FULLER, OF DAYTON, OHIO, ASSIGNOR TO THE NATIONAL CASH REGISTER COMPANY, OF DAYTON, OHIO.

REGISTERING AND RECORDING MECHANISM.

1,311,884.

Specification of Letters Patent. Patented Aug. 5, 1919.

Application filed September 2, 1915. Serial No. 48,620.

*To all whom it may concern:*

Be it known that I, FREDERICK L. FULLER, a citizen of the United States, residing at Dayton, in the county of Montgomery and State of Ohio, have invented certain new and useful Improvements in Registering and Recording Mechanisms, of which I declare the following to be a full, clear, and exact description.

This invention relates to cash registers and the like and more particularly to the printing mechanism therefor.

The principal object of this invention is to provide an improved form of printing mechanism.

Another object of this invention is to provide a machine with a plurality of totalizers and construct improved printing means for printing in columns appropriate to the totalizers.

It is also an object of this invention to provide improved means for shifting the type carriers for the purpose of columnar printing instead of shifting the record material.

The invention also comprises a carriage for holding a card and a depositor's book and means for removing the card after an item has been printed thereon, to permit the item to be printed on the book, the latter being under the card at the beginning of the operation of the machine. The impression means is operated twice to carry the card against the type carriers the first time and the book against the carriers the second time.

Improved means for preventing the contact of the impression means with the type carriers when no record material is present is also embodied in the present invention.

The invention also discloses novel means for preventing operation of the machine when the record strip is exhausted.

A still further object of the invention is to provide an improved form of zero eliminating mechanism having the well known function of preventing the printing of zeros by the type carriers of higher order than that adjusted to print another amount character and permitting the printing of zeros by those type carriers of lower order when one of higher order is adjusted to print an amount character other than zero.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Of said drawings:—

Fig. 2 is a transverse vertical section of the machine being taken at the right side of one of the banks of amount keys as on the line A—A of Fig. 1.

Fig. 3 is a full sized detail view showing the right hand cam plate and coöperating parts for moving the totalizer frame to engage a totalizer with the totalizer actuating mechanism.

Fig. 4 is a detail view of the intermeshing worm gears whereby the rotation of the main drive shaft is imparted to the shaft carrying the various cams for operating the printing mechanism.

Fig. 5 is a transverse vertical section of the machine taken at the right hand side of the bank of transaction keys.

Fig. 6 is a right hand detail side view of one of the banks of waiters' keys.

Fig. 7 is a horizontal sectional view through the printing mechanism being taken on the line B—B of Fig. 8 with the carriage for the depositor's book and card omitted.

Fig. 8 is a longitudinal sectional view through the printing mechanism being taken on the line C—C of Fig. 7.

Fig. 9 is a full sized detail view showing the cam grooves in the disk for operating the ribbon feeding mechanism and the detail strip impression means.

Fig. 10 is a full sized detail view of the cams for operating the platen adapted to cause the type carriers to print on the depositor's book and card.

Fig. 11 is a detail longitudinal sectional view through the printing mechanism being taken on the line D—D of Fig. 7.

Fig. 12 is a full sized detail view of the cams and coöperating arm for operating the mechanism designed to move the type carriers for printing on the depositor's book and card out of engagement with the actuating gears therefor.

Fig. 13 is a full sized detail view of the cams and coöperating arm and a portion of the bar for operating the means constructed to shift the amount type carriers for printing on the depositor's book and card when an amount is withdrawn.

Fig. 14 is a detail view of one of the racks and its zero eliminating device for operating an amount type carrier, the rack being shown in zero position.

Fig. 15 comprises two detail views of two adjacent levers for operating the corresponding amount rack bars to eliminate the printing of zeros, the left hand view being in perspective and the right hand partial view being taken from the left hand end of the levers to show their over-lapping fingers or projections.

Fig. 16 is a detail sectional view taken on the line E—E of Fig. 7, and shows part of the rack and gear connections to the type carriers and part of the device for preventing the release of the machine when the detail strip is exhausted.

Fig. 17 is a full sized detail top plan view of the type carriers and their operating connections to the rack bars shown in Fig. 16.

Fig. 18 is a full sized detail cross sectional view through the means for manually adjusting the date type carriers.

Fig. 19 is a full sized detail view of the means for adjusting the type carriers for printing the year.

Figs. 20 and 21 are full sized cross sectional views through the depositor's book carriage and show, in side elevation, the type carriers for printing on the depositors' books and cards and the means for shifting the amount type carriers to print in the amount type columns, Fig. 20 showing the amount type carriers in position to print in the "deposit" columns on the depositor's book and card and Fig. 21 showing the amount type carriers in position to print in the "withdrawn" columns.

Fig. 22 is a full sized cross sectional view through the amount type carriers for printing on the depositors' books and cards.

Fig. 23 is a view of a portion of the detail strip printed by the machine showing the printing of both items and totals.

Fig. 24 is a full sized perspective view showing the impression means for the depositor's book and card, and the impression means lock which is effective in the absence of a book and card.

Fig. 25 is a detail view of the means for alining the type carriers and their operating connections in adjusted positions.

Figure 26:
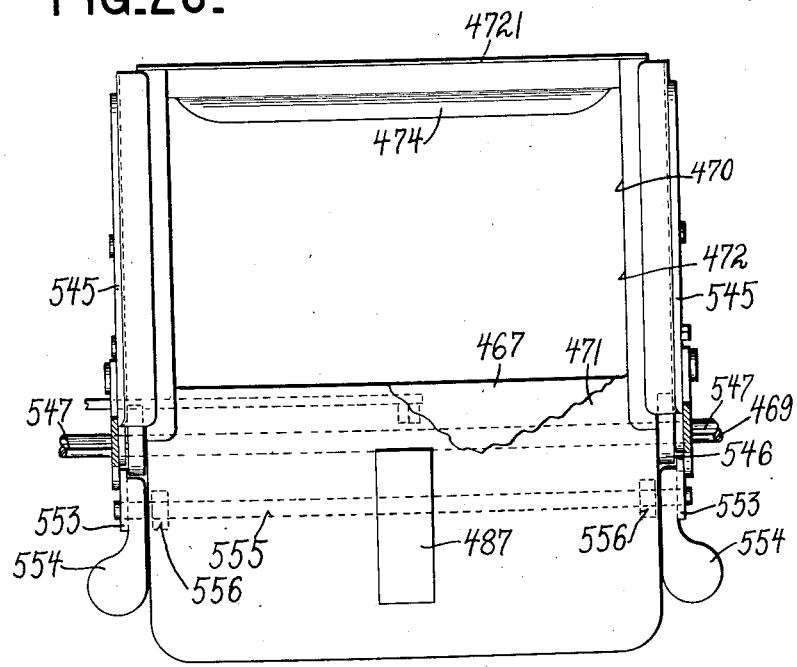

Fig. 26 is a detail top plan view of the carriage for carrying the depositor's book and card.

Figure 27:
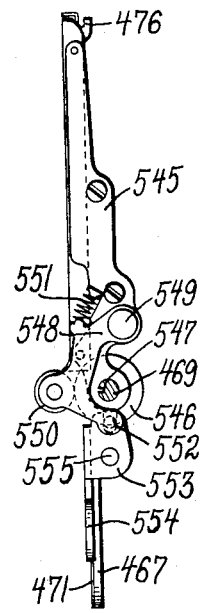

Fig. 27 is a detail side view of the carriage shown in Fig. 26.

Figure 28:
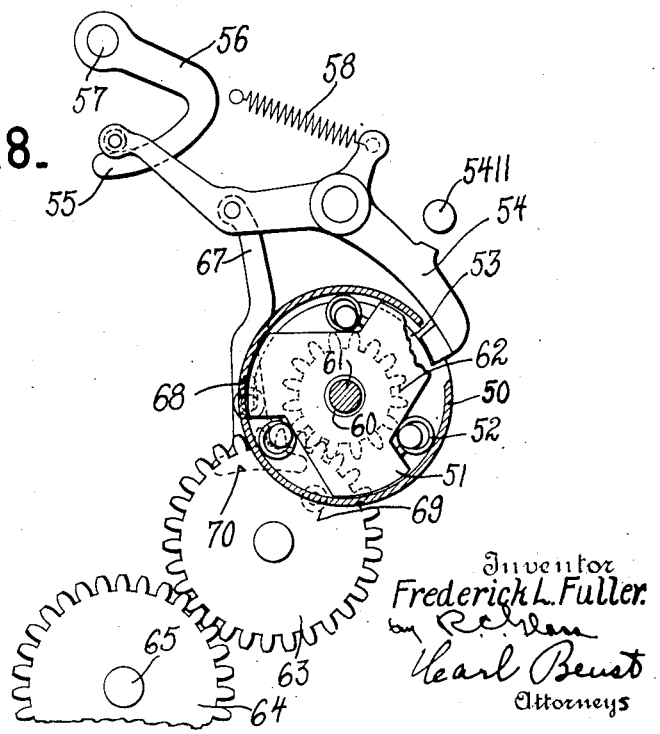

Fig. 28 is a detail view showing part of the motor clutch, the locking means therefor and the gearing through which the motor rotates the main drive shaft of the machine.

Fig. 29 is a view of a depositor's card showing printed entries of withdrawals and deposits.

Fig. 30 is a view of the same depositor's book in open position and showing the same records printed therein by the machine.

Fig. 31 is a top plan view of part of the mechanism for controlling the releasing of the operating mechanism and effecting locking and releasing of the keys and the devices mounted on a shaft which is operated by the total lever adapted to prepare the machine for total and sub-total printing operations.

Fig. 32 is a detail front plan view of a portion of the totalizing mechanism.

Figs. 33 and 34 are detail views of the cam constructed to shift the totalizer frame to bring the desired totalizer into operative position with the actuating mechanism, the cam being shown in front elevation in Fig. 34 and in side elevation in Fig. 33.

Figure 1:
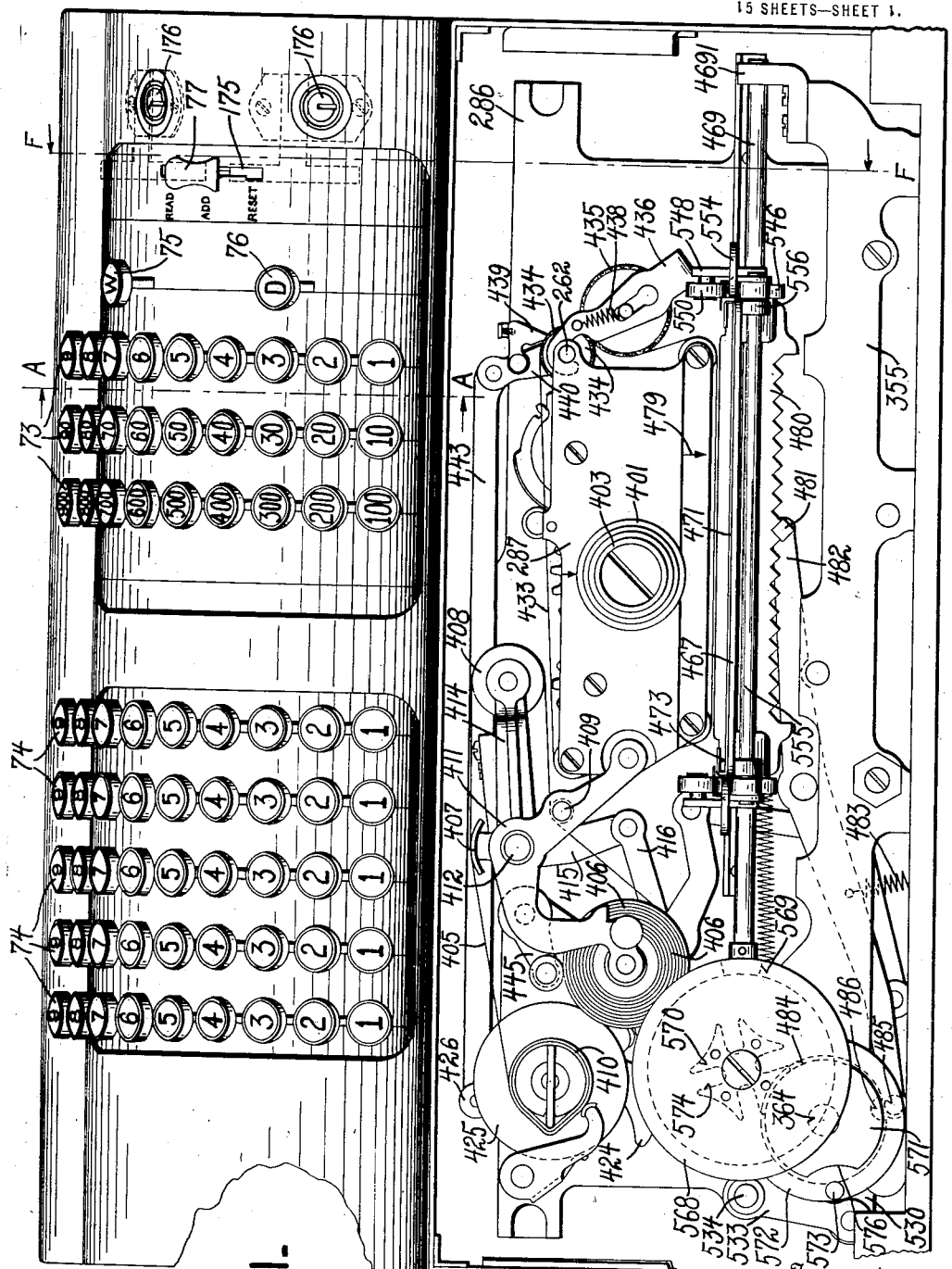
Figure 1 is a front view of the machine constructed according to the present invention, the hood or casing for the printing mechanism being omitted to expose the printing mechanism to view.

Fig. 35 is a full sized transverse vertical section through the machine taken on the line F—F of Fig. 1 and showing the mechanism for controlling the machine in total and subtotal printing operations.

Figure 36:
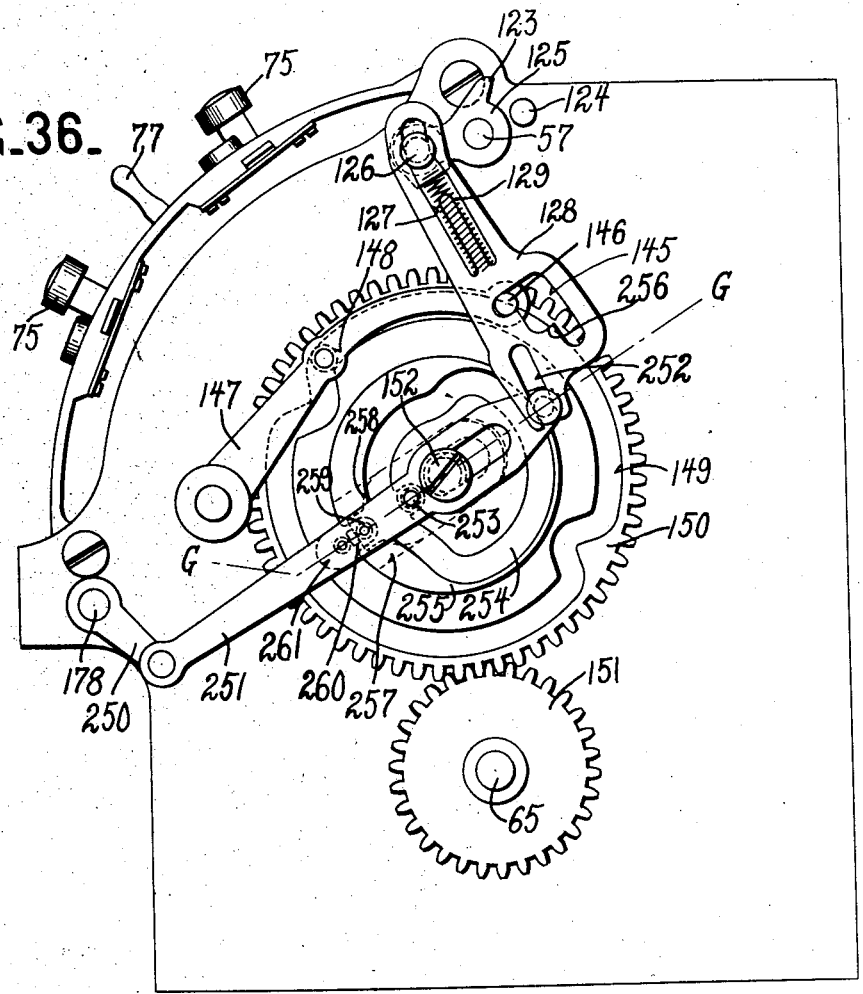

Fig. 36 is a right hand side elevation of the machine with the cabinet omitted.

Figure 37:
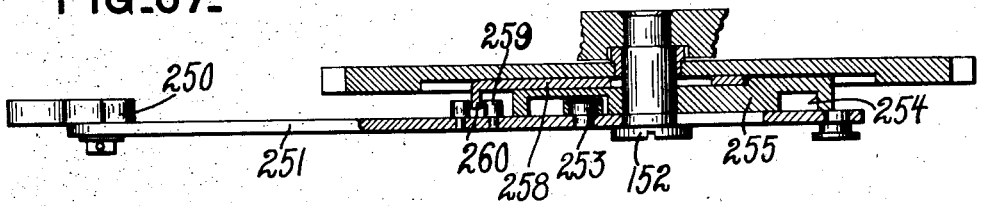

Fig. 37 is a full sized cross sectional view taken on the line G—G of Fig. 36.

The machine in the illustrative form of embodiment disclosed herein is designed, more especially for use in postal savings systems and in ordinary savings banks, for insuring accuracy in and facilitating the recording of amounts deposited and withdrawn by depositors. The machine is more particularly adapted separately to totalize the amounts deposited and the amounts withdrawn and to print the depositor's number and the amounts deposited and withdrawn by the depositor on a permanent record retained in the machine, on the depositor's bank book in the possession of the depositor and on the depositor's card kept in the files of the savings bank or post office. Although the accompanying drawings show the invention in preferred form applied to this particular use it is to be understood that it is not intended to limit the invention to such use as it is equally well adapted for use in institutions similar to savings banks, such as building associations and ordinary banks, and also in many other mercantile establishments and in many other relations not only in the use of deposit and withdrawal of moneys but of stock, quantities and price, etc.

Described in general terms the machine comprises two totalizers mounted in a frame which is movable to bring either one of the totalizers into operative relation with differential actuators controlled by manipulative means, such as banks of keys. The movement of the frame carrying the totalizers is controlled by two transaction keys. In the illustrative form of embodiment disclosed herein, one of these totalizers is adapted to accumulate all of the amounts deposited by the depositors for any desired period of time and the other totalizer is employed to accumulate all of the amounts withdrawn by the depositors.

Two groups of type carriers are employed in the present machine, one group being used to print on the detail strip and the other on the depositors' books and cards. It is understood, of course, that there is one of these books and cards for each depositor, each depositor being given a different number. The depositors' books are retained in the possession of the depositors while the cards are retained in the files of the bank or post office. Each group of type carriers comprises a set of amount type carriers controlled by the banks of amount keys, a set of depositors' type carriers controlled by banks of keys which are operated in accordance to the depositor's number and a set of manually adjustable date type carriers. A type carrier controlled by the transaction keys and a type carrier controlled by the total lever are also included in the group of type carriers for printing on the detail strip.

When a depositor wishes to deposit or withdraw a sum of money the operator inserts the depositor's book in the carriage in the machine and inserts the corresponding card retained in the files of the bank or post office above the book in a guide-way on the carriage. The carriage is manually shifted relative to the type carriers in order that the desired lines on the book and card may be printed on by the type carriers employed to print on the card and book. The operator then depresses the amount keys and the depositor's keys representing the amount and the depositor's number and finally depresses the deposit or withdrawal key, dependent upon whether the amount is deposited or withdrawn for the purpose of releasing the machine. Upon operation of the machine the depositors' and the amount keys control the positioning of the corresponding type carriers and the impression means is then operated twice, the card being printed upon the first time the impression means is operated, and the book the second. After the card has been printed upon and before the platen is again operated to effect printing on the book, the card is ejected from the carriage to permit the printing on the book. Upon each operation of the machine the type carriers for printing on the book and the card are rocked out of engagement with actuating gears into printing position. If the amount printed is deposited, the amount type carriers for printing on the book and the card are not shifted but if the amount is withdrawn these type carriers are shifted by shifting means under the control of the withdrawal key for the purpose of printing in the withdrawn columns on the book and the card.

The impression means for printing on the detail strip is operated at each operation of the machine. The impression means for the card and the book, however, is automatically disabled when neither a book or a card is in the above mentioned carriage, this being the case when the machine is operated to print a total or sub-total only on the detail strip. The detail strip also controls means for preventing depression of the transaction keys, that is, the withdrawal and deposit keys, when the detail strip is exhausted.

For the purpose of illustration the invention is shown applied to a type of machine the general principle of which is disclosed in Letters Patent of the United States, issued to William A. Chryst, on June 26, 1917, No. 1,230,864, and containing improvements shown and described in Letters Patent of the United States, issued to applicant on Oct. 9, 1917, No. 1,242,170. While the invention is shown applied to this particular type of machine it is to be understood that the invention is susceptible of use with other types of accounting machines and therefore it is not intended to limit the scope of the invention to use with the particular type of machine shown.

*Operating mechanism.*

The motor mechanism which it is desired to use in connection with the present invention is of a well known type shown and described in Letters Patent of the United States, No. 1,144,418, granted to Charles F. Kettering and William A. Chryst, on June 29, 1915, and for a detailed description of same reference may be had to that patent. Only part of the clutch mechanism for the electric driving device is shown in the accompanying drawings showing the present invention.

The motor and mechanism in Fig. 28, is located on the left end of the machine. A member 50 forming one part of the clutch device and shown in section (Fig. 28) is rotated through means (not shown) by the motor. A plate 51 forming another member of the clutch coöperates with rollers 52 and is connected thereby to the clutch member 50 upon release of the machine, as fully shown and described in the aforesaid Kettering and Chryst patent. A locking disk 53 is provided with a locking shoulder which is engaged by a nose on a locking lever 54 pivoted to the left hand side frame of the machine. The opposite end of the lever 54 is provided with a roller normally resting upon the upper edge of a curved portion 55 of an arm 56 fast on the left hand end of a shaft 57. When the arm 56 is rocked counter clockwise (Fig. 28) to release the machine, as will be described later, the locking lever 54 is rocked counter clockwise, by a spring 58, out of engagement with the shoulder on the disk 53, (this movement being limited by a stud 5411 on the side frame) whereupon this disk and other parts (not shown) are moved by spring action to effect the connection of the motor clutch and close a circuit through the motor. The clutch member 51 is fast on a sleeve 60 mounted on a stud 61 projecting from the side frame of the machine. A gear wheel 62 is fast on the sleeve 60 and meshes with an intermediate gear 63 which in turn meshes with a gear 64 fast on the main drive shaft 65. Through this gearing the motor gives the main drive shaft 65 one complete rotation upon each adding operation of the machine.

For the purpose of restoring the locking arm 54 to locking position near the end of the operation of the machine, a link 67 is pivotally connected at its upper end to the lever 54 and has a slot 68 through which a pin on the frame of the machine projects to guide the link in its reciprocation. The gear wheel 63 is provided with a stud 69 which, near the end of the operation of the machine, engages the lower curved surface 70 of the link 67. The surface 70 is so constructed that its engagement with the stud 69 causes the link 67 to be raised thereby moving the locking lever 54 back to normal locking position.

As will be described later, the arm 56 is rocked back to its normal position just before the stud 69 passes out of engagement with the surface 70 on the link 67 in order to retain the locking lever 54 in its normal position.

*Keyboard.*

The keyboard (Fig. 1) comprises three banks of amount keys 73, five banks of depositors' keys 74, one bank of transaction keys, consisting of the withdrawal key 75 and the deposit key 76, and a total control lever 77, employed to control the machine for total and sub-total printing operations. The construction of the key banks is very similar to that shown and described in the aforesaid Fuller patent and Chryst patent, and therefore, they will be described but briefly here. The keys of each bank are mounted in an individual frame 79 (Figs. 2, 5 and 6) mounted on cross rods 80 and springs (not shown) are employed normally to retain the keys in undepressed position.

The amount keys 73 (Fig. 2) coöperate with key detents 81 and locking plates 82. The detents 81 are supported at their upper and lower ends respectively by arms 83 and 84 loosely pivoted on pins 85 on the key frames 79. When a key is depressed the inclined edge of a shoulder 87 on the key engages a corresponding pin 88 on the detent, thus moving the latter downwardly until the shoulder is past the pin, when the detent is spring drawn upwardly thereby retaining the key in depressed position. The arm 84 engages a pin 89 on a zero stop pawl 90 which is normally in effective position and when the detent 81 is moved downward, the pawl 90 is rocked clockwise (Fig. 2) to render it ineffective. A spring 91 connected at its lower end to the pawl and at its upper end to the key frame serves to retain the pawl 90 and detent 81 in normal position.

The locking plates 82 (Fig. 2) for the banks of amount keys are provided with extensions which immediately upon the depression of a transaction key pass over pins 92 on the depressed keys and under the pins 92 on the undepressed keys, thereby preventing manipulation of the keys during an operation of the machine. In order to give the locking plates 82 the required upward movement the upper supporting arms 93 for the locking plates are provided with extensions 94 extending over a rod 95 carried by arms 96 (Figs. 2 and 31) fast on the shaft 57. This shaft 57 is rocked counter-clockwise (Fig. 2) upon depression of a transaction key, as will be described presently, whereupon the rod 95 lifts the locking plates into locking position.

Key detents 99 (Fig. 6) and locking plates 100 for the banks of depositors' keys are similar to the detents and locking plates for the amount keys and perform the same functions. Arms 101 supporting the upper ends of the locking plates 100 are provided with recesses 102 through which projects a rod 103 (Figs. 6 and 31) supported at its right hand end in an arm projecting from a yoke 105 and at its left hand end in an arm 104. The arm 104 and the yoke 105 are fast on a sleeve 106 and the yoke 105 is also fast on a sleeve 107, these sleeves 106 and 107 being loose on the shaft 57. The sleeves 106 and 107 are rocked clockwise (Fig. 6) as will be described presently when a transaction key is depressed, whereupon the rod 103 is raised to lift the locking plates 100 to locking position. The lower ends of the detents 99 are supported by arms 84 in the same maner as the detents for the amount keys and these arms supporting the detents for the depositors' keys also operate zero stop pawls 90 which arrest the differential mechanism, controlled by these keys, in zero position when the keys in the corresponding banks are not operated.

As shown in Fig. 5, a plate 110, which is similar to the detents for the banks of amount keys and supported in a similar manner, is lowered by depression of a transaction key to move the corresponding zero stop pawl 90 out of normal position shown in this figure, but not for the purpose of locking the depressed key in depressed position, the keys not being provided with locking shoulders as is the case with the amount and depositors' keys. Coöperating with the pins 92 on the transactions keys is a plate 111 provided with curved slots 112 which the pins 92 enter upon depression of the keys. As the slots 112 are curved, depression of a key through the pin 92 lowers the plate 111 against the action of a spring 113, the supporting arms 114 for the plate being swung on pivots 85.

The upper arm 114 carries a pin 115 extending into a recess (Figs. 5 and 31) formed in an arm 116 fast on a sleeve 117 loosely mounted on a cross rod 118, which is prevented from rotating by an arm 119 (Fig. 35) fast on the rod 118 and forked to straddle the shaft 57. The sleeve 117 carries an arm 120 the outer end of which is forked to receive a pin 121 projecting from a yoke 122 the right hand side of which is loosely mounted on the shaft 57 and the left hand side of which is fast on the sleeve 107 (Fig. 31). It can be seen that through the sleeve 117, arm 120, yoke 122, sleeve 107 and yoke 105, the downward movement of the plate 111 on depression of the transaction key rocks the sleeve 106 to raise the rod 103 (Fig. 6) and thereby raise the locking plates 100 for the depositors' keys to lock these keys against manipulation during operation of the machine, as above stated.

Upon depression of a transaction key the shaft 57 (Fig. 28) is rocked to move the arm 56 out of engagement with the roller on the locking lever 54 and thereby permit operation of the motor. To this end the right hand end of the shaft 57 carries an arm 125 (Figs. 31 and 36) carrying a pin 126 projecting into a slot 127 formed in the upper end of a link 128. A coil spring 129 tends to rock the arm 125 and therefore the shaft 57 clockwise as viewed in Fig. 36, but this movement of the shaft 57 is normally prevented by engagement of a pin 131 (Fig. 35) on an arm 132 loose on the shaft 57 with the outer end of an arm 133 rigidly mounted on the sleeve 117. A forwardly extending finger 134 integral with the arm 132 engages over a stud 135 on an arm 136, rigidly mounted on the shaft 57. When the sleeve 117 is rocked by the depression of a transaction key, as above described, the arm 133 is rocked counter clockwise out of the path of the pin 131 whereupon the spring 129 (Fig. 36) is permitted to rock the shaft 57 to move the arm 56 out of engagement with the roller on the locking lever 54 to permit the release of the machine. This movement of the shaft 57 is limited by the engagement of a finger 123 on the arm 125 with a stud 124 on the frame of the machine. When the shaft 57 is rocked in this manner the rod 95 (Figs. 2 and 31) is elevated to lift the locking plates for the amount keys, as already described.

As the pin 131 passes under the arm 133 upon depression of a transaction key, it can be seen that the sleeve 117 and the plate 111 (Fig. 5) cannot be moved back to normal position when the operator removes his finger from the key. As the slots 112 are curved each coöperates with the pin 92 on its corresponding key when the key is depressed to retain the latter in depressed position while the plate 111 is in moved position, and as the slot for the undepressed key is moved away from under its pin 92 the undepressed key will be locked against depression during operation of the machine.

For the purpose of compelling the depression of a depositor's key before a transaction key can be operated and thereby call the operator's attention to the fact that the keys representing the depositor's number have not been depressed the following device, which is fully described in the aforesaid Fuller patent, will be briefly referred to here. An arm 138 (Figs. 6 and 31) is rigidly mounted on the sleeve 106 and carries a pin 139 which is normally behind the outer end of a rearwardly extending arm 140 of a yoke member 141 loosely mounted on the rod 118. The yoke member 141 has five upwardly and forwardly extending fingers 142 which normally engage pins 143 by which the upper ends of the detents 99 for the banks of depositors' keys are pivotally connected to their upper supporting arms 144. Should it be attempted to release the machine without first depressing a depositor's key it will be seen that the stud 139 will abut the arm 140 and hence prevent movement of the plate 111 (Fig. 5) by the transaction key. When a depositor's key, however, is depressed the pin 143, which connects the upper end of the detent 99 for the particular bank with its supporting arm through its engagement with the corresponding finger 142 rocks the yoke member 141 counter clockwise (Fig. 6) against the action of a spring (not shown) whereupon the arm 140 is moved away from in front of the stud 139 to permit the release of the machine upon depression of the transaction key.

To effect the release of the amount keys the mechanism shown in Fig. 36 is provided, and this mechanism will be referred to but briefly here as it is fully described in the hereinbefore mentioned Fuller patent. The link 128 is provided with a slot 145 and a pin 146 mounted on the rear end of an arm 130

147 projects into a set-off of the slot 145, as shown in Fig. 36. The arm 147 carries a roller 148 projecting into a cam groove 149 formed in the face of a gear wheel 150 loose on a stud 152. The gear wheel 150 meshes with a gear 151, which is fast on the main drive shaft 65 and one-half the size of the gear 150 whereby the latter is given one-half rotation upon each operation of the machine. The cam groove 149 is so constructed that near the end of the operation of the machine the arm 147 is rocked to lower the link 128. In this way the shaft 57 is rocked first clockwise (Fig. 2) past normal position and then counter-clockwise to normal position. As the rod 95 is carried by the arms 96 fast on the shaft 57 this rod is also moved past normal position and engages projections 153 on the arms 83 supporting the upper ends of the detents 81 and forces the detents downward, and as the locking plates 82 are also moved to normal position by this movement of the rod 95 the key springs are permitted to restore the depressed amount keys to undepressed position. When the shaft 57 is rocked in this manner the arm 56 (Fig. 28) is moved to normal position, the lever 54 having been restored to normal locking position before the arm 56 is moved to normal position.

The above described movement of the shaft 57 past normal position is also employed to effect the release of the depressed transaction key and the restoration of the depositors' keys locking plates 100 for the depositors' keys to normal position. To effect the release of the transaction key a bell crank lever 155 (Figs. 31 and 35) is loosely mounted on the rod 118 and the upper edge of the rearwardly extending arm of the lever coöperates with the pin 131. The vertical arm of the lever 155 engages the stud 135 mounted on the arm 136. The lever 155 is so constructed that during the counter clockwise movement of the shaft 57, as above described, the stud 135 rocks the lever 155 counter clockwise (Fig. 35) so that the arm 132 through the engagement of the pin 131 with the lever 155 is rocked to carry the pin 131 from under the arm 133, whereupon the spring 113 (Fig. 5) raises the plate 111, and the depressed transaction key is restored to normal position by its spring. The raising of the plate 111 also rocks the sleeve 117 (Fig. 31) to normal position so that the end of the arm 133 is again restored to its normal position in front of the pin 131. The cross rod 103 (Figs. 6 and 31) is lowered at the same time to normal position by the rocking of the sleeve 117 through the yoke 105, sleeve 107, yoke 122 and arm 120. This movement of the rod 103, of course, lowers the locking plates 100 for the depositors' keys to permit the restoration of the keys to normal position by the springs.

At the same time that the locking plates 100 are lowered, as above described, the detents 99 for the depositors' keys are lowered so that the keys may be restored to normal position. To this end a restoring rod 157 (Figs. 6 and 31) extends behind the downwardly extending fingers 158 of the arms 84 supporting the lower ends of the detents 99 for the banks of depositors' keys. The rod 157 is supported at its ends in arms 156 and 159 which are loosely mounted on a rod 160 supported in brackets 161 fast on a frame 162. The arm 159 is pivotally connected to the lower end of a link 163 which at its upper end is provided with a slot 164 through which a pin 165 projects. This pin 165 is carried at the lower end of an arm 166 rigidly mounted on the shaft 57. When the shaft 57 is rocked clockwise (Fig. 6) to effect release of the machine as above described the pin 165 moves idly forward in the slot 164. When, however, the shaft 57 is rocked counter clockwise (Fig. 6) past normal position the pin 165 engages the rear end of the slot 164 thereby raising the link 163 and rocking the arms 156 and 159 to swing the restoring rod 157 forwardly. This movement of the rod 157 rocks the arms 84 clockwise thereby lowering the detents 99 at the same time that the locking plates 100 are lowered to release the depressed keys.

In order to prevent the operator from retaining the depressed transaction key in depressed position until the end of one complete rotation of the machine and thereby causing an immediate second operation of the machine an arm 169 (Fig. 35) is provided. When the machine is released the pin 131 (Fig. 35) moves between the arm 133 and the arm 169. When the shaft 57 is rocked counter clockwise past normal position near the end of the operation of the machine, as above described, the pin 131 is carried rearwardly past normal position so that if the operator retains the transaction key in depressed position a spring 170 connecting the arms 133 and 169 rocks the latter in front of the pin 131 as fully described in the above mentioned Fuller patent. When the operator finally removes his finger from the depressed transaction key the arm 133 is lowered in front of the pin 131 and as the lower edge of the arm 133 engages the upper edge of the arm 169 this latter arm, at the same time, is carried out of engagement with the pin 131.

The total lever 77 is in the form of a nearly circular plate (Fig. 35) loosely mounted on a stud 174 projecting from the right hand frame of the machine. The finger piece or handle of the lever is movable in a slot 175 (Fig. 1) to adjust it to the desired position. If the lever is moved one step above its central or adding position it will control the machine for printing a subtotal and when moved one step below its adding position it will control the machine for printing a total. Locks 176 are provided to prevent unauthorized persons from operating the total lever. When the locks are operated by keys inserted into the key barrels to lock the total lever in adding position the bolt of one of the locks is above and the bolt of the other lock below the handle of the lever.

When the total lever is in position to control the machine for printing a total or subtotal depression of the transaction key appropriate to the totalizer to be actuated effects the release of the machine as in adding operations. When a total or sub-total is to be printed no depositor's key is depressed and it is, therefore, necessary to operate the yoked member 141 (Figs. 6 and 31) in order to permit the release of the machine. This is accomplished by movement of the total lever out of adding position through mechanism fully shown and described in the aforesaid Fuller patent. This mechanism is not shown in the accompanying drawings as reference may be had to the above patent for a description of the same.

In order to prevent operation of the amount and depositors' keys during a total or sub-total printing operation a shaft 178 (Figs. 2 and 31) carries arms 179 which support a rod 180 extending across the ends of the arms 84 which support the lower ends of the detents 81 and 99 for the banks of amount and depositors' keys respectively. When the total lever is adjusted out of adding position the shaft 178 is rocked counter clockwise, as viewed in Fig. 2, through an arm 182 (Fig. 35) fast on the shaft 178 and carrying a pin 183 projecting into a slot 184 formed in a lever 185 which is operated by a slot 186 in the total lever as fully described in the aforesaid Fuller patent. When the shaft 178 is rocked by the adjustment of the total lever to a total or sub-total position the rod 180 is lowered in front of the curved edges 173 of the arms 84 and thereby prevents operation of the detents and hence operation of the amount and depositors' keys. The movement of the rod 180 also moves the zero stop pawls 90 out of operative position.

A projection 185 on the upper end of the vertical arm of a bell crank lever 186 (Fig. 35) is moved above the arm 136 when the total lever is not in one of its three predetermined positions in order to prevent release of the machine when the total lever is not in one of these positions. To rock the lever 186 its rearwardly extending arm carries a pin extending into a slot 187 formed in the total lever, the slot being so formed that when the total lever is in one of its three positions the projection 185 is not above the arm 136, as shown in Fig. 35, but when the lever is out of one of these positions the projection is over the arm 136. As shown in Fig. 35, the slot 187 is much longer than is necessary for the particular embodiment disclosed herein, as the mechanism shown in this figure is of a standard form adapted for use in a number of machines of a similar type but having various other embodiments, the particular construction shown in Fig. 35 being adapted for use in a machine employing three groups of totalizers which necessitates in such machines the adjustment of the totalizer to seven positions instead of three as in the present invention.

*Amount differential mechanism.*

To drive the differential mechanism of the machine the drive shaft 65 is provided with a plurality of pairs of cams 189 and 190 (Figs. 2 and 5) each pair of which cooperates with rollers 191 and 192 respectively carried by Y-shaped levers 193 of which there is one for each bank of keys in the machine. Each of these levers 193 is pivoted at 194 on a corresponding frame 195 as fully shown and described in the aforesaid Fuller patent. Loosely mounted on rods 196 carried by the frames 195, which support the differential units adjacent the banks of amount keys (Fig. 2) are differentially movable members 197 carrying racks 198 and transfer arms 199 for operating the totalizer pinions 200. The levers 193 at the upper ends of their upwardly extending arms are pivotally connected by links 201 to driving segments 202 loose on the rods 196. The driving segments 202 adjacent the banks of amount keys, are connected to the differentially movable members 197 by latches 203 each of which is supported by an arm 204 and a lever 205 pivoted on the corresponding differentially movable member. Springs 206 hold the rear end of the latches 203 in engagement with shoulders on the driving segments. When the segments 202 for the banks of amount keys are driven by their cams 189 and 190 the differentially movable members 187 are carried with their latches up to points where the forwardly extending arms of the levers 205 engage the depressed amount keys. Such engagement results in disengagement of the latches from the driving segments and engagement of the forward ends of the latches with the particular notches 208 opposite the latches at the time and formed in plates 209. Upon return movement of the driving segments to normal position the latches connect the differentially movable members thereto and return the latter to normal position. If the key is not depressed in an amount bank the zero stop pawl 90 for that particular bank operates the latch to arrest the differentially movable member in zero position. When a key is depressed, however, the arm 84 through its engagement

Totalizers.

As already stated, there are two totalizers one of which in the illustrative form of embodiment shown herein is assigned to accumulate the total amounts deposited while the other accumulates the total amounts withdrawn. The totalizers consist of a plurality of pairs of pinions 200 (Figs. 2 and 32) loosely mounted on a tube 210 carrying spacing sleeves or collars 213 to prevent lateral movement of the pinions on the tube. Each totalizer consists of one pinion in each pair, the pinions being denominationally arranged in pairs as is well known in the art. The tube 210 is mounted at its ends in frames 211 and 212 which are provided with rollers 214 engaging a shaft 215. The ends of the shaft 215 project into slots in plates 216 (Figs. 3 and 32) fixed on the side frames of the machine. Arms 217 rigid on the shaft 215 near its ends carry rollers 218 (Fig. 3) extending into cam slots in the fixed plates 216. The right hand arm 217 is pivotally connected to a link 220 (Figs. 3 and 35) which is first raised and then lowered by mechanism to be described later. This operation of the link 220 rocks the arms 217 and the shaft 215 and at the same time the movement of the rollers 218 in the cam grooves in the plates 216 moves the selected totalizer opposite the actuating racks 198 into engagement with the latter.

To shift the totalizer frame along the shaft 215 so that the desired totalizer may be brought opposite the actuating racks 198 the frame 211 (Fig. 32) carries a rod 221 provided with a roller 222 which extends into a cam groove 223 (Figs. 33 and 34) in a shifting cam 224. A link 225 (Fig. 33) connects the cam member 224 with an arm (not shown) fast on the shaft 226 (Fig. 5). An arm 227 (Fig. 5) is also fast on the shaft 226 and this arm is pivotally connected to the upper end of a link 228 which at its lower end is pivotally connected to an arm 229. The link 228 carries a roller 230 projecting into a slot 231 formed in the rear end of a link 232 pivotally connected at its forward end to a differentially movable arm 233 controlled by the transaction keys. The latch 234 for this arm 233 is like the latches for the banks of amount keys and is supported on the arm 233 in the same manner, and the arm 233 is driven by its appropriate segment 202. As the forward end of the link 232 is pivoted to the arm 233 this end of the link is positioned differentially with the arm 233. When the link 232 is moved in this manner a roller 235 carried by the lever 193 for driving the segment 202 appropriate to the arm 233 engages the link and carries it into engagement with a hub on a rod 196 if the link is not already in engagement therewith. In this manner, as more fully described in the aforesaid Chryst patent, the shifting cam 224 is rocked directly from one position to another under the control of the transaction keys through the above described connections to the arm 233 to shift the desired totalizer into position to be engaged with the actuating racks 198.

The mechanism for operating the link 220 (Fig. 35) to effect an engagement of the selected totalizer upon adding, sub-totaling, and totaling operations of the machine is fully shown and described in the aforesaid Fuller patent and therefore this mechanism will be described but briefly here. The upper end of the link 220 (Fig. 35) carries a roller 237 normally resting in a hook 238 formed on a plate 239 loosely mounted on the stud 174. A member 240 which is pivoted at its rear end to the upper end of a Y-shaped lever 241, has a notch engaging over a stud 242 on the plate 239 when the lever is in adding position. The lever 241 carries two oppositely extending rollers 243 and 244 which coöperate with cams 245 and 246 respectively fast on the drive shaft 65. These cams 245 and 246 are so constructed as to rock the plate 239 clockwise (Fig. 35) through the lever 241 and member 240 after the driving segments 202 for the banks of amount keys have reached their limit of movement. Then after the driving segments have been restored to normal position the member 240 is moved to normal position. In this manner the link 220 is reciprocated to effect the engagement and disengagement of the desired totalizer with the actuators as before described.

To print a total or sub-total from a totalizer the main drive shaft 65 is given two cycles of operation. To permit two cycles of operation of the driving shaft during such operations the shaft 178 rigidly carries an arm 250 (Figs. 36 and 37) pivotally connected to the forward end of a pitman 251, which at its rear end carries a pin projecting into a slot 252 formed in the link 128. When the total lever is adjusted out of adding position the shaft 178 is rocked clockwise (Fig. 36) as above stated, whereby the pitman 251 is drawn forwardly to move a roller 253 on the pitman out of a set-off in a cam groove 254 into position to operate in the cam groove 254 which is formed in a disk 255 loosely mounted on the stud 152. This movement of the pitman 251 also rocks the link 128 forwardly so that the pin 146 on the arm 147 is taken out of normal engagement with the set-off in the slot 145. Near the end of the first cycle of operation of the machine, when the arm 147 is rocked clockwise by the coöperation of its roller 148 in the slot 149, the pin 146 moves in the rear part of the slot 145 and therefore does not move the link 128 or shaft 57, so that when the motor locking lever 54 (Fig. 28) is moved to normal position during the first cycle of operation of the machine and after the pin 69 moves out of engagement with the lower curved edge of the link 67 the spring 58 again operates the locking lever 54 to permit a continued second operation of the machine. Near the end of the second operation, however, the pin 146 engages a shoulder 256 in the slot 145 and thereby lowers the link 128 to restore the shaft 57 and the arm 56 to normal position to retain the locking lever 54 in locking position after the latter has been restored to locking position during the second operation of the machine. The cam groove 254 is so constructed that during the first cycle of operation of the machine the link 128 is moved slightly forward so that the pin 146 does not effect movement of the link 128 during the first cycle of operation, but during the second cycle of operation the cam groove 254 restores the pitman 251 to the position to which it was adjusted by the total lever so that the pin 146 engages the shoulder 256 to restore the shaft 57 and arm 56 to normal position. The disk 255 is not rotated during adding operations and in order to effect rotation of the disk during totaling and sub-totaling operations a plate 258 (Figs. 36 and 37) slidable in a groove 257 in the disk 255, is moved forwardly upon adjustment of the total lever out of adding position by the coöperation of pins 259 on the pitman 251 with a projection 260 on the plate 258. When the plate 258 is moved forwardly in this manner its forward end engages in a recessed portion 261 in the gear wheel 150 to connect the disk 255 and gear wheel so that they rotate as a unit.

To print a sub-total from a totalizer the totalizer is moved into engagement with the actuating racks 198 near the end of the first cycle of operation of the driving shaft 65 and is retained in engagement therewith while the actuating racks are rocked upwardly under the control of the totalizer wheels as fully described in the aforesaid Fuller patent and then returned to normal position, the disengagement of the totalizer being effected at the end of the second rotation of the shaft. In total printing operations the desired totalizer is moved into engagement with the actuating racks 198 at the same time as in the sub-total printing operations but is moved out of engagement before the racks begin their return movement. In order to effect the different times of engagement and disengagement of a totalizer with the actuating rack, the member 240 (Fig. 35) is controlled by the total lever 77 through a member 264, a link 265, an arm 266, and the mechanism shown in Fig. 36 for effecting two operations of the machine as fully shown and described in the aforesaid Fuller patent.

A shaft 269 (Fig. 35) carrying an arm 270 pivotally connected to a link 271 which is operated by the plate 239 upon total and sub-total printing operations carries means (not shown) for controlling devices (not shown) operated by the totalizer pinions to control the extent of movement of the differentially movable members 197 as fully shown and described in the aforesaid Fuller patent.

The plate 239 is alined at different times during total and sub-total printing operations by a lever 272 carrying a pin 273, projecting into a slot 274 in the member 264 as is fully described in the above mentioned Fuller patent.

An alining plate 276 (Figs. 2 and 32) carried by levers 277 fast on a shaft 278 supported in the totalizer frame, engages the totalizer pinions to prevent their rotation when out of engagement with the actuating racks. Cam levers 279 coöperate with the levers 277 to rock the plate 276 out of engagement with the totalizer pinions when the shaft 215, upon which the levers 279 are mounted, is rocked to carry the selected totalizer into engagement with the actuators.

Printing mechanism.

Two groups or rows of type carriers are provided in the present machine, one group being adapted to print upon a detail strip while the other is adapted to print on a depositor's card shown in Fig. 29 and on a depositor's book shown in Fig. 30. The group of type carriers for printing on the detail strip comprises the set of date type carriers 280 (Fig. 17) a set of type carriers 281 for printing the depositors' numbers, a set of amount type carriers 282, a type carrier 283 controlled by the total lever and a type carrier 284 controlled by the transaction keys. These type carriers are mounted on a cross rod 285 which is supported at its rear end in the rear printer frame 286 and at its forward end in a plate 287, (Figs. 1 and 8) supported by rods 262, 263, 248 and 249 projecting from the frame 286. The row or group of type carriers (Figs. 17, 20 and 21) for printing on the depositor's card and book comprises date type carriers 288, type carriers 289 for printing the depositor's numbers, and the amount type carriers 290. These type carriers for printing on the depositors' card and books are mounted on a cross rod 291 which is mounted at its forward end in an arm 292 and at its rear end in an arm 293, the arms 292 and 293 being fast on a sleeve 275 loosely mounted on a cross rod 294 mounted at its forward end in the plate 287 and at its rear end in the frame 286. All of the type carriers are in the form of pinions having type on the outer ends of their teeth.

The depositor's number type carriers 281 and 289 (Fig. 17) mesh with the gears 294, the amount type carriers 282 and 290 mesh with gears 295, the type carrier 283 meshes with a gear 296 and the type carrier 284 meshes with a gear 297. The gears 294, 295, 296 and 297 are rigidly mounted on the forward ends of nested sleeves 298 mounted to rotate about a rod 299 supported at its forward end in the frame 287 and at its rear end in the frame 162. The sleeves 298 carrying the gears 294, 295, 296 and 297 carry at their rear ends gears 300, 301, 302 and 303 respectively.

All of the gears 301 except that for the units denomination, mesh with sets of rack teeth 304 (Figs. 7, 14 and 16) formed in the upper edges of rack bars 305. The gear 301 for the units denomination meshes with the teeth formed on the upper edge of a rack bar 320. The rack bars 305 and 320 are provided with slots 306 through which rods 307 project, the bars being slidably mounted in this manner on the rods 307. The rods 307 are supported at their ends in the frames 162 and 286 and have spacing sleeves 308 for preventing movement of the rack bars longitudinally of the rods. The rack bars 305 on the lower edges are provided with sets of rack teeth 309 coöperating with the teeth on mutilated gears 310, and the set of teeth on the lower edge of the rack bar 320 meshes with a segment gear 322. These gears 310 and 322 are rigidly mounted on shafts 311 which at their forward ends are journaled in the frame 286 and at their rear ends in bosses 312 on the frame 162. The shafts 311 at their rear ends carry worm wheels 313 which mesh with segmental worm gears 314 (Figs. 2 and 7) loosely mounted on a cross rod 315 supported in the end frames of the machine. Integral with the hubs of the segmental worm gears 314 are projections 316 which are rigidly connected by pins to arms 317 loosely mounted on the cross rod 315. The arms 317 are pivotally connected to the lower ends of links 318 which at their upper ends are pivotally connected to the rear ends of beams 319. These beams 319 at their forward ends are pivotally connected to the differentially movable members 197. It can be seen from this construction that the forward ends of the beams 319 are moved differentially with the members 197 and that the rollers 235 on the corresponding levers 193 engage the beams to carry them into engagement with the hubs on the rods 196 if the beams are not already in engagement therewith differentially to position the amount type carriers 282 and 290 through the above described connections comprising the links 318, arms 317, segmental worm gears 314, worm wheels 313, shafts 311, gear wheels 310 and 322, rack bars 305 and 320, gear wheels 301, sleeves 298 and gears 295.

As is usual in the art, there are provided totalizer wheels for which no banks of amount keys are employed, these elements being of highest denominations and operated in adding operations only when transfers to them are necessary. Differential units like those controlled by the amount keys are provided to actuate these totalizer elements of highest denomination, and through the corresponding connections above described, position the two type carriers 282 of highest denominations during total and sub-total printing operations of the machine.

The gear 303 mounted on the sleeve carrying the gear 297 which meshes with the special type carrier 284 controlled by the transaction keys meshes with the teeth formed on the upper edge of a rack bar 321 (Figs. 7 and 16) mounted to slide on the rods 307 in the same manner as the amount rack bars 305. The rack bar 321 has teeth 325 on its lower edge meshing with a segment gear 326 rigidly mounted on the forward end of a shaft 327 which is like the shafts 311. The shaft 327 carries a worm wheel 328 (Fig. 5) meshing with a segmental worm gear 329, which is similar to the arms and the arm 229, is rigidly connected to the hub of the segmental worm gear 329. It will be remembered that the arm 229 is connected to the link 228 which is moved directly from one position to another through the link 232 connected to the differentially movable arm 233 controlled by the transaction keys. Therefore, through these connections just described, the special type carrier 284 is adjusted from one position to another under the control of the transaction keys.

The gear wheels 300, which are rigidly mounted on the forward ends of the sleeves 298, carrying the gears 294, meshing with the depositors' type wheels 281, and 289, mesh with teeth formed on the upper edges of rack bars 331 (Figs. 7 and 16) which are mounted on the rods 307 in the same manner as the amount rack bars 305. The teeth formed on the lower edges of these rack bars 331 mesh with segment gears 332 rigidly mounted on shafts 333, which also are like the shafts 311. These shafts 333 at their rear ends carry worm wheels which are like the worm wheels 313 and mesh with segmental worm gears 334 (Fig. 7) to which are rigidly connected arms 335. The arms 335 are pivotally connected to the lower ends of links 336 which have the same construction as the links 318 (Fig. 2) controlled by the amount keys. The links 336 are pivotally connected to the rear ends of beams (not shown) which are similar to the beams 319 and connected to differentially movable arms (not shown) similar to the arm 233 (Fig. 5) controlled by the transaction keys. These differentially movable arms for the depositors' banks of keys carry latch mechanism similar to that already described and are driven by corresponding driving segments 202. The beams connected to these differentially movable arms, controlled by the depositors' keys, are positioned differentially in the same manner as are the links 319, and, therefore, through the above described connections to the depositors' type carriers the latter are positioned under the control of depositors' keys.

The gear 302 mounted on the sleeve 298, carrying the gear 296, which meshes with the type wheel 283, meshes with the teeth formed on the upper edge of a rack bar 340 (Figs. 7 and 16) which is mounted to slide on the rods 307 and has rack teeth on its lower edge meshing with a segment gear 341 rigidly mounted on a shaft 342, which is also like the shafts 311. The rear end of this shaft 342 (Fig. 7) carries a worm wheel, similar to the worm wheels 313 and meshing with a segmental worm gear 344. An arm 345, rigidly connected to the worm gear 344, is pivotally connected to the lower end of a link 346 (Fig. 35) which at its upper end is pivotally mounted on the total lever 77. It can be seen from this construction that the adjustment of the total lever through the above described connections positions the type wheel 283. A blank tooth on this type carrier is at the printing line when the machine is operated for addition, this type carrier being adapted to print characters only when a total or sub-total is printed, a "Z" (Fig. 23) being printed when a total is printed and an "X" when a sub-total is printed.

The following described alining device is employed to aline the sleeves and therefore the type carriers in their adjusted position after they have been differentially positioned and during the return movement of the differential mechanism to normal position. An alining yoke 350 (Figs. 11, 14 and 25) is loosely mounted on a cross rod 351 supported in the frames 162 and 286. The forward side arm of the yoke 350 is rigidly connected to a downwardly extending arm 352, the lower end of which projects into a recess formed in the upper end of an arm 353 rigidly mounted on a shaft 354 supported at its rear end in the frame 286 and at its forward end in a frame 355 (Fig. 7). Rigidly mounted on the shaft 354 (Fig. 25) is an arm 356 pivotally connected to the right hand end of a link 357, which at its left hand end is pivotally connected to a lever 358 loosely mounted on a shaft 359, mounted in the frames 286 and 355. The lever 358 carries oppositely extending rollers 360 and 361 which coöperate with the peripheries of cams 362 and 363 respectively. The cams 362 and 363 are rigidly mounted on a shaft 364 which is journaled in the frame 355 (Fig. 7) and in brackets 365 mounted on the base of the machine. The shaft 364 carries a worm gear 366 (Figs. 4 and 7) meshing with a worm gear 367 fast on the drive shaft 65. These gears 366 and 367 are so constructed that upon each operation of the machine the single rotation of the shaft 65 is imparted to the shaft 364. The cams 362 and 363 are so constructed that the alining yoke 350 is rocked clockwise (Figs. 11 and 25) through the arm 352, the arm 353, shaft 354, arm 356, link 357 and arm 358, to move its alining edge 369 into engagement with the gears 300, 301, 302 and 303 before the differential mechanism begins its return movement to normal position, the alining yoke being rocked out of engagement with these gears after the differential mechanism has reached normal position.

The mechanism for preventing the printing of ciphers to the left of the highest denomination represented by a digit other than a cipher in any one printed number and for permitting the printing of ciphers to the right will now be described. In the present form of embodiment the units type wheels are adapted to print a cipher whenever they are adjusted to zero position the zero eliminating mechanism not being constructed to eliminate the printing of zeros by the units type carriers. Each of the rack bars 305 is provided with a notch 371 (Figs. 14 and 16) adapted to be engaged by the nose 372 on an arm 373 of a corresponding three-armed lever 374. The levers 374 are loosely mounted on a cross rod 375 supported by the lower ends of arms 376 (Figs. 7, 14 and 16) loosely mounted on the stud 377 projecting from the frame 162. Arms 378 of the levers 374 are connected to the left hand ends of springs 370 which at their opposite ends are connected to levers 379 loosely mounted on a stud 380. As shown in Figs. 15 and 16, the arms 378 of the adjacent levers 374 are differently positioned on the levers and the adjacent members 379 have different constructions, for the purpose of permitting the levers 374 and the members 379 to be placed closely together without interference between the springs 370. The horizontal arms of the levers 379 engage a shaft 523 and the downwardly extending arms of these members engage shoulders 383 on the racks 305. The arms 384 of the levers 374 have fingers or flanges 385 which project behind the fingers 386 on the arms 384 of the levers of the next higher denominations as best shown in Fig. 15. That is to say, the finger 385 on the tens lever 374 projects behind the finger 386 on the hundreds lever, the finger 385 on the hundreds lever projects behind the finger 386 on the thousands lever and the finger 385 on the thousands lever projects behind the finger 386 on the tens of thousands lever.

The segment gears 310 have a flattened portion 388 normally in engagement with the lower edge of the racks 305 when the type wheels are in zero positions one of the gears 310 being shown in this position in Fig. 14. The rod 375 projects into the recess formed in the upper end of an arm 389 loosely mounted on a stud 390. The arm 389 carries a roller 391 projecting into a cam groove formed in the face of a disk 392 rigidly mounted on the shaft 364. The cam groove in the disk 392 is so constructed that the arm 389 is rocked clockwise (Figs. 14 and 16) from the normal position shown in Fig. 16 to the position shown in Fig. 14 near the very beginning of the operation of the machine. This movement of the arm 389 swings the rod 375 toward the right and the fingers 386 engage the hub of one of the arms 376 whereby the levers 374 are rocked counter clockwise against the influence of their springs 370 to the position shown in Fig. 14. After the racks 305 have been differentially positioned and before the alining yoke 350 is rocked to alining position the cam 392 rocks the arm 389 counter clockwise to normal position. As the rod 375 is moved toward the left by the return movement of the arm 389 to normal position, the springs 370 rock the levers 374 clockwise about the rod 375. If the rack bars 305 are in any position other than zero the noses 372 of the levers 374 engage the upper edges of the rack bars to the left of the notches 371. If a rack bar 305 is in zero position and the rack bars of higher denomination are also in such position the corresponding lever 374 is rocked by its spring 370 until the nose engages the upper edge of the rack bar to the right of the notch 371 so that the nose 372 engages in a notch 371 and moves the rack bar 305 one step toward the left during the last step of movement of the levers 372 toward the left. This movement of the rack bar moves the corresponding type carrier one step from its zero position so that the asterisk on the next tooth of the type wheel prints on the detail strip. When a rack bar 305 is moved in this manner a projection 394 (Fig. 14) on the mutilated gear 310 engages in a recess 395 formed in the rack bar 305. This movement of the rack bar 305 is independent of the mutilated gear 310 because the flattened surface 388 of the gear engages with the lower edge of the rack bar, and the engagement of the projection 394 on the gear in the recess 395 locks the gear against movement. When the mutilated gear 310 is moved from zero position the left hand tooth 309 on the rack bar is engaged by the tooth 396 on the mutilated gear to effect meshing of the gear with the rack teeth 309.

When a rack bar 305 is adjusted to zero position by the differential mechanism and a rack bar of higher order is adjusted to a different position it can be seen that the engagement of the finger 385 on the lever 374 appropriate to the rack bar of lower denomination engages the finger 386 on the lever 374 for the rack bar of next higher denomination and therefore prevents the lever 374 for the rack bar of lower denomination from being rocked further clockwise than the lever 374 of higher denomination when the arm 389 is moved to normal position. Therefore, it can be seen that the nose 372 on the lever 374 for a rack bar 305 of lower denomination is not permitted to engage its corresponding notch 371 and hence the rack bar of lower denomination is not moved out of zero position if a rack bar of higher denomination has been moved to a position different than zero position.

When the rack bars 305 are moved one step toward the left to eliminate the printing of zeros by their corresponding type carriers, their shoulders 383 through their engagement with the downwardly extending arms of the members 379 rock the latter clockwise against the tension of the springs 370. Then, when the levers 374 are moved toward the right at the beginning of the next operation of the machine the noses 372 are raised out of engagement with the notches 371 whereupon the springs 370 rock the members 379 to normal position and therefore slide the moved rack bars 305 to their zero position so that upon adjustment of the mutilated gears 310 by the differential mechanism the rack bars will mesh with the teeth on the mutilated gears.

Instead of printing an asterisk the tens of thousands type wheel 282 and the thousands type wheel 290 print dollar signs when the type wheels move backwardly one step as above described, these type wheels being of highest denominations. The thousands type wheels 290 only print a dollar sign and therefore have no amount characters as only amounts registered in adding operations of the machine are printed on the depositor's book and card. The tens of thousands type wheel 282 never prints zeros, and this type wheel and the thousands type wheel 282 upon total and sub-total printing operations are controlled by the additional totalizer wheels, and are adjusted differentially in accordance with the amounts standing on the latter.

The date wheels 280 and 288 mesh with gears 398 (Figs. 17, 18 and 19) rigidly mounted on members 399 having nested hubs 400 and loosely mounted on the rod 299. The outermost hub 400 is shaped to form at its forward end a hollow, cylindrical knob 401 having a knurled edge by which the corresponding date wheels can be adjusted. The hubs 400 of the other members 399 have projections 397 (Fig. 19) coöperating in recesses 402 formed in the hubs of nested, cylindrical, hollow knobs 403 mounted within the knob 401. It can be seen from this construction that the knobs 403 can be pulled forwardly relative to the hubs 400 so that the knobs may be firmly gripped and turned, the recesses 402 not being moved out of engagement with the projections 397 when the knobs 403 are moved forwardly. As can be seen from Figs. 17 and 18, the knurled portions of the knobs 401 and 403 are so close together when the knobs 403 are in their inner positions that the desired one of the latter could not be easily gripped and therefore the knobs 403 are constructed so that they may be pulled out to facilitate their turning.

The detail strip 405 (Figs. 1, 8 and 23) is fed from a supply roll 406 over a guide bar 409, about a platen roller 408, over a guide plate 407, onto a storage roll 410. The guide bar 409 and the rod carrying the supply roll 410 are mounted at their rear ends in the frame 286, and at their forward ends in an arm 411, supported by a rod 412 and the frame 287. The platen 408 is mounted in a frame 414 loosely mounted on the rod 412. Rigidly connected to the platen frame 414 is a downwardly extending arm 415 which is pivotally connected by a link 416 to the upper end of an arm 417 (Figs. 7 and 9) loosely mounted on a shaft 359. An arm 419 is rigidly connected to the hub 420 (Fig. 7) of the arm 417 and the arm 419 carries a roller projecting into a cam groove 421 (Fig. 9) formed in the rear face of a disk 422 rigidly mounted on the shaft 364. The cam groove 421 is so constructed that while the type carriers are alined in their differentially moved positions the platen frame is rocked clockwise (Figs. 1 and 8) to carry the detail strip against the printing line of the group of type carriers mounted on the rod 285.

Only part of the mechanism for feeding the detail strip at each operation of the machine is shown in the drawings as this mechanism is old and well known in the art. In order to operate this feeding mechanism, which includes a lever 424 and a disk 425 (Figs. 1 and 8) associated with the storage roll, a lever 426 (Fig. 11) is loosely mounted on a rod 427 supporting the supply roll and is connected by a sleeve 428 to the feeding mechanism. The downwardly extending arm of the lever 426 carries a pin projecting into a slot formed in the upper end of an arm 429 fast on the shaft 359. Rigidly mounted on the shaft 359 is an arm 430 (Figs. 7 and 9) carrying a roller projecting into a cam groove 431 formed in the forward face of the disk 422. This cam groove 431 is so shaped that near the beginning of the operation of the machine the lever 426 is rocked clockwise and then near the end of the operation of the machine rocked counter clockwise to operate the detail strip feeding mechanism.

An inking ribbon 433 (Figs. 1 and 8) passes between ink supplying and feeding rollers 434 and 435 under guide rolls or sleeves mounted on the rods 263 and 248 and over a guide roll or sleeve on the rod 249, the ribbon being of a continuous type and passing below the type carriers for printing on the depositor's book and card and above the type carriers for printing on the detail strip. The roll 435 is mounted in a yoked frame 436 (Fig. 1) swung on the rod 262 upon which the feeding roll 434 is mounted. Springs 438, one on each side of the yoked frame 436, yieldingly retain the roll 435 in engagement with the roll 434.

For the purpose of feeding the ribbon a pawl 439 (Figs. 8 and 11) is pivotally mounted on an arm 440 loose on the rod 262 and coöperates with a ratchet wheel 441 fast to the feed roll 434. A spring 442 interposed between a lug on the arm 440 and the pawl 439 serves to retain the latter in engagement with the teeth of the ratchet wheel 441. The arm 440 is connected by a link 443 to the upwardly extending arm of the lever 426. When the lever 426 is rocked clockwise (Fig. 11) as above described, the arm 440 is rocked in the same direction through the link 443 whereupon the pawl 439, through its coöperation with the ratchet wheel 441 rotates the roll 434 which through its coöperation with the roll 435 inks and feeds the inking ribbon. When the arm 440 is restored to normal position the pawl 439 engages behind the next succeeding tooth.

Means are provided for preventing depression of a transaction key to release the machine when the detail strip on the supply roll is exhausted and this means will now be described. An arm 445 (Fig. 8) is rigidly mounted on a sleeve 446 (Fig. 16) loosely mounted on a stud 447 and the arm 445 carries a roller resting upon the detail strip on the supply roll 406. Rigidly mounted on the sleeve 446 is an arm 448 which is connected by a link 449 to a lever 450 (Figs. 5 and 16) loosely mounted on a stud projecting from the frame 286. One of the arms of the lever 450 is provided with a slot 451 straddling a pin projecting from the upper end of a plate 452. The plate 452 is provided with slots through which a pin 453 and the right hand rod 307 projects, the plate being guided in its vertical movements in this manner. A spring 454, which is connected at one end to a pin 455 on the lever 450 and at its opposite end to the frame 286 tends to rock the lever 450 counter clockwise (Fig. 16) and thereby through the link 449, arm 448, and sleeve 446 retains the roller on the arm 445 in engagement with the detail strip on the supply roll the roller being lowered as the paper is fed from the supply roll. The plate 452 has a rearwardly extending flange 456 (Fig. 5) and the edge of this flange above a shoulder 457 engages a pin 458 mounted on one of the arms of a yoked member 459 (Figs. 5 and 31) loosely mounted on the shaft 178. The yoked member 459 has an arm 460 carrying a stud 463. A spring 464 (Fig. 5) is connected to a pin on an arm 465 (Fig. 31) of the yoke and to the frame 162 the spring serving to retain the pin 458 in engagement with the flange 456. When the detail strip on the supply roll is exhausted the shoulder 457 on the flange 456 is raised above the pin 458 whereupon the spring 464 rocks the yoke clockwise (Fig. 5) moving the pin 458 under the shoulder 457. This movement of the yoke 459 moves the pin 463 in front of the lower curved end of the arm 84 supporting the plate 110 operated by the transaction keys. With the pin 463 in this position the arm 84 and plate 110 are locked against movement and hence a transaction key cannot be depressed to release the machine. When the roller on the arm 445 is raised to permit a new supply roll to be inserted in the machine the plate 452 is lowered whereupon the yoke 459 is rocked to normal position by the coöperation of the shoulder 457 with the pin 458 so that the machine may be released by depression of a transaction key.

As shown in Fig. 2, a glass plate 466 is carried by the hood or casing for the printing mechanism and is above the detail strip so that the printed amounts may be viewed.

The carriage, which is positioned in the machine and into which the depositor's book and card is inserted, is shown in Figs. 1, 8, 20, 21, 26 and 27, and will now be described. The carriage comprises a frame or plate 467 having at its sides downward extending flanges 468 (Figs. 1, 20 and 21) through which a shaft 469 mounted in brackets 4691 (Figs. 1 and 7) on the frame 355 projects. As best shown in Figs. 8, 20, 21 and 26, the plate has an opening 470 through which the impression means to be described later is operated to engage the depositor's book. Rigidly mounted and super-imposed on the plate 467 is a thin plate 471 having an opening 472 coinciding with the opening 470 in the plate 467. The rear end of the plate 471 is bent to form a vertical flange 4721 against which the side of the book and card rests when the latter are in printing position on the carriage. The sides of the plate 471 are bent to form grooves 473 (Figs. 1, 8, 20 and 21) the top edge and bottom edge of the depositor's book when opened being inserted in these grooves when the book is placed in the machine. The plate 471 has a downwardly and forwardly inclined bent portion 474 which projects through the rear portion of the opening 470 in the plate 467. This bent portion is provided so that when the book is inserted in the carriage the edge of the book where the leaves are bound together will engage this bent portion so that the book is flattened when fully inserted in the carriage, it being seen that if this bent portion were not provided the book might engage the rear sides of the openings in the plates 467 and 471 which would prevent it from being fully inserted in the carriage. The rear end of a pivoted arm or bar 487 engages the forward side of the book when the latter has been pushed completely into the carriage. The arm is pivoted at its forward end and is positioned in the forward portion of the carriage. A spring 4751 mounted in a pocket 4752 formed in the plate 467 engages the lower side of the arm 487 and normally retains the arm in the position shown in Figs. 20 and 21. While the book is being inserted in the carriage the book depresses the rear end of the arm 487 and as soon as the book is fully inserted the spring 4751 moves the arm to normal position. When the book is withdrawn from the machine the operator depresses the plate 487 with his finger.

Rigidly mounted on the sides of the plate 467 are right angled plates or guides 475 the horizontal portions of which project over the horizontal portions of the bent sides of the plate 471, guideways being formed between these horizontal portions and above the guideways 473 so that the card may be inserted in the carriage above the book. The rear edge of the plate 467 (Figs. 20 and 21) is constructed to form a groove 476 in which projects a horizontal ridge 477 of a guide bar 478 (Figs. 8, 20 and 21) mounted on the frame 286. The carriage in this manner is slidably mounted on the guide bar 478 and the shaft 469 so that the desired lines of the book and card may be brought to the printing line of the type carriers, the printing line being indicated by an arrow 479 on the plate 287 (Fig. 1).

In order to aline the carriage in adjusted position and to lock it against movement during the operation of the machine a notched bar 480 (Fig. 1) is rigidly mounted at its ends in the flanges 468 of the plate 467 and its notches coöperate with a squared pin 481 mounted on the right hand end of a lever 482 pivoted on the frame 355. A spring 483 connected at its upper end to the lever 482 and at its lower end to the base of the machine serves yieldingly to force the pin 481 into engagement with the notches in the plate 480 to aline the carriage in adjusted position, the pin idly wiping over the notches when the carriage is adjusted from one position to another. For the purpose of locking the carriage against adjustment during the operation of the machine a disk 484 (Figs. 1 and 7) coöperates with a pin 485 on the left hand end of the lever 482. When the machine is in normal condition the pin 485 is free to move in a notch 486 formed in the periphery of a disk 484 when the lever 482 is rocked during the adjustment of the carriage. During the operation of the machine, however, the notch 486 is carried away from over the pin 485 and therefore the lever is locked against movement and hence the carriage against adjustment.

As already stated, the type carriers for printing on the depositor's card and book are mounted on a rod 291 (Figs. 8, 11, 17, 20 and 21) carried by arms 292 and 293, rigidly mounted on the sleeve 275. In order to disengage these type carriers for printing on the depositor's book and card from the gears meshing therewith, so that the type wheels are moved to their printing line and to permit shifting of the amount type wheels when an amount is withdrawn, as will presently be described, the sleeve 275 and the arms 292 and 293 are swung to move the type wheels out of engagement with the gears. To this end a lever 488 (Figs. 8 and 11) is rigidly mounted on the rear end of the sleeve 275 and carries rollers 489 and 490 coöperating with the periphery of a cam 491, loosely mounted on a bushing 492 (Figs. 11 and 17) which is fast on the frame 286 and through which the sleeves 298 project. A pin 493 carried by the cam 491 projects into the bifurcated end of an arm 494 integral with the rear side of a yoked member 495, loosely mounted on the shaft 354. Integral with the forward side of the yoked member 495 is a downwardly extending arm 496 which is connected by a link 497 to an arm 498 (Figs. 11 and 12) loosely mounted on the shaft 359. The arm 498 carries oppositely extending rollers 499 and 500 coöperating with the peripheries of cams 501 and 502 respectively, fast on the shaft 364. The cams 501 and 502 are so constructed that through the above described connections the cam 491 is rocked clockwise (Fig. 11) after the type carriers have been differentially positioned. The cam 491 is so constructed that when it is rocked in this manner it rocks the lever 488, the sleeve 275 and arms 292 and 293 to swing the type wheels out of engagement with their meshing gears. Near the end of the operation of the machine the restoration of the cam 491 rocks the lever 488, sleeve 275 and arms 292 and 293 to normal position to move the type wheels into mesh with their corresponding gears.

As above stated the amount type wheels 290 are shifted during operations in which the withdrawal key has been depressed, these type carriers being in position, when not shifted, to print in the deposit columns and when shifted to print in the withdrawn columns on the card and book. The amount type carriers 290 (Figs. 17, 20, 21 and 22) are loosely mounted on a sleeve 505 (Fig. 22) which is mounted to slide on the shaft 291. The type wheels are prevented from moving longitudinally of the sleeve by a flange 506 formed on one end of the sleeve and a collar 507 fastened to the opposite end of the sleeve. A bar 508 is slidably mounted in a groove 509 formed in the shaft 291 parallel with the axis of the shaft. The sleeve 505 passes over the bar 508 and is prevented from movement longitudinally of the bar by shoulders 510 on the bar these shoulders serving to move the sleeve 505 and type wheels when the bar is shifted.

The bar 508 is provided with a roller 512 (Figs. 20 and 21) projecting into a cam groove 513 formed in a shifting cam 514 loosely mounted on the sleeve 275. The member 514 has a curved portion 515 projecting over the arm 293 and this portion 515 is rigidly connected to a mutilated gear 516 (Figs. 11, 20 and 21) also loosely mounted on the sleeve 275. This gear 516 meshes with the teeth on a segmental arm 517 loosely mounted on a stud 518. Rigidly connected to the arm 517 is a downwardly extending arm 519 which is pivotally connected to the right hand end of a link 520 which at its left hand end, is pivotally supported in a vertical link 521. The link 521 at its upper end is pivoted to an arm 522 rigidly mounted on the shaft 523, supported in the frames 162 and 268. Fast on the shaft 523 is an arm 524 (Fig. 16) which at its free end carries a roller projecting into the cam groove 526 formed in the rack bar 321 controlled by the bank of transaction keys, as above described. The cam groove 526 is so constructed that when the rack bar 321 is moved under the control of the deposit key 76 the roller on the arm 524 is in the position shown in the slot in Fig. 16, but when the bar is moved under the control of the withdrawal key 75 the roller on the arm 524 is raised in the slot thereby rocking the arm 524, the shaft 523 and the arm 522 counter clockwise (Figs. 11 and 16) to raise the left hand end of the link 520. This movement of the link 520 carries a roller 528 on the link 520 into a recess 529 formed in a reciprocating bar 530. The bar 530 at its right hand end is provided with a slot through which the shaft 354 passes and its rear end is provided with a slot through which the shaft 364 and a rod 531 passes, the bar being guided at its right hand end by the shaft 354. The left hand end of the bar 530 is pivotally connected by a pin 532 to the downwardly extending arm of a bell crank lever 533 loosely mounted on a stud 534 on the frame 286. The pin 532 carries a roller (Fig. 13) coöperating with a cam 535 and the nearly horizontal arm of the bell crank lever 533 carries a roller 536 coöperating with a cam 537.
The cams 535 and 537 are fast on the shaft 364 and are so constructed that the bar 530 is moved toward the right immediately after the type wheels for printing on the depositor's book and card have been rocked out of engagement with their operating gears.

It can be seen from the above construction that when the deposit key 76 is operated the rack bar 321 is moved to the position shown in Fig. 16 if it is not already in that position from the last operation of the machine. With the rack bar in this position the roller 528 (Fig. 11) on the link 520 is not in engagement with recesses 529 of the bar 530. Therefore, when a deposit key is operated the reciprocation of the bar 530 does not operate the link 520 the arm 517, and the shifting cam 514 (Figs. 20 and 21) and therefore the amount type carriers 290 are not shifted and they print in the deposit columns on the card and book. With the link 520 in the position shown in Fig. 11, the link being in this position when the machine is operated to register an amount deposited, a pin 527 engages in the recess formed in the link 520 to lock the latter and, therefore, the shifting cam 514 against movement. When the withdrawal key 75 is depressed, however, the slot 526 in the rack bar 321 operates the arm 524, the shaft 523 and arm 522 to raise the roller 528 into the recess 529 so that when the bar 530 is moved toward the right the segment arm 517 is rocked counter clockwise (Fig. 11) to operate the shifting cam 514. When the shifting cam 514 is operated in this manner, its cam groove 513 through its coöperation with the roller 512 shifts the bar 508, the sleeve 505 and the amount type carriers to the position shown in Fig. 21, so that the type carriers print in the withdrawn columns on the card and book. Before the type carriers are rocked into normal engagement with their operating gears, the bar 530 and therefore the cam 514 are restored to normal position to shift the amount type carriers back to normal position on the rod 291.

In order to aline the type carriers mounted on the rod 291 when they are out of engagement with their operating gears, a stationary alining plate 539 (Fig. 8) is supported at one end by an arm 540 and at its other end by the plate 287. As the type wheels pass out of engagement with their operating gears they engage the left hand edge of the bar 539 and therefore the type wheels are alined and locked against movement when out of engagement with their operating gears.

While the type carriers for printing on the book and card are out of engagement with their operating gears a platen 543 (Figs. 7, 8 and 24) carried on an arm 544 is operated twice. The first time this platen is operated it engages the underside of the card over the book and forces the card into book and forces the card over the book into engagement with the type carriers whereby the latter print through the inking ribbon 433 onto the card. The card is then fed forwardly out of printing position and the second time the platen is operated it carries the book into engagement with the type wheels. The mechanism for moving the card forwardly out of printing position will now be described.

Plates or frames 545 (Figs. 1, 26 and 27) are rigidly connected to the flanges 468 of the plate 467 and the shaft 469 projects through the forward ends of these plates 545. Mounted on the shaft 469 and between the plates 545 and the sides of the plate 467 are feeding rollers 546. The shaft 469 has a splined groove 547 and the rollers 546 have feathers projecting into the groove whereby the rollers are slidable on the shaft with the carriage and adapted to be rotated with the shaft. Arms 548 pivotally mounted at 549 (Fig. 27) on the plates 545 carry rollers 550 engaging the rollers 546. Compressed springs 551 interposed between noses on the arms 548 and the plates 545 serve yieldingly to retain the rollers 550 in engagement with rollers 546. The forward ends of the arms 548 carry pins 552 engaging in recesses formed in the vertical flanges 553 of finger pieces 554 the flanges 553 being rigidly mounted on a shaft 555 carried by lugs 556 projecting from the lower side of the plate 467. When the card is inserted into the machine the forward ends of the finger pieces 545 are depressed by the operator whereupon the rollers 550 are elevated out of engagement with the rollers 546 to permit insertion of the card between the rollers of each pair. After the card has been printed upon the shaft 469 is rotated in a counter clockwise direction (Figs. 21, 20, and 27) whereupon the coöperating rollers 526 and 550 feed the card out of printing position and onto the forwarl portion of the plate 467.

For the purpose of rotating the shaft 469 a bevel gear 568 (Figs. 1 and 7) loosely mounted on a stud projecting from the frame 355 meshes with a bevel gear 569 fast on the left hand end of the shaft 469. Rigidly connected to the bevel gear 568 is a member 570, constituting a Geneva stop. The member 570 coöperates with a disk 571 fast on the shaft 364. A second disk 572 rigidly mounted on the shaft 364 beside the disk 371 carries a pin 573 for engaging in the recesses 574 in the member 570. The disk 571 normally engages one of the curved sides of the member 570 thereby locking the bevel gear 568 and shaft 469 against rotation. Immediately after the card has been printed upon, the pin 573 enters one of the slots 574 in the member 570 thereby rotating the member 570 and bevel gear 468 one-fourth of a rotation, the concave, cut-away portion 576 of the disk 571 being then in position to permit the rotation of the member 570. This one-fourth rotation of the bevel gear 568 through its meshing with the bevel gear 569 gives the shaft 469 one complete rotation whereupon the coöperating feeding rollers 546 and 550 feeding the card out of printing position.

The means for operating the platen 543 will now be described. The platen arm 544 (Figs. 8 and 24) is loosely mounted on the shaft 354 and is provided with a pin 578 projecting into a slot 579 formed in a lever 580 loosely mounted on the shaft 354. A spring 581 (Fig. 8) is connected at its upper end to the pin 578 and at its lower end to a pin on the downwardly extending projection 582 of the lever 580. The outer end of an arm 597 of the lever 580 is forked over a pin 583 mounted on the arm 584 of a lever 585 loosely mounted on the rod 531. A spring 586 is connected at its right hand end to a pin on a vertically extending arm 587 of the lever 580 and at its left hand end is connected to the vertical arm 588 of the lever 585. Arms 589 and 590 (Fig. 10) of the lever 585 carry oppositely extending rollers 591 and 592 respectively coöperating with cams 593 and 594 repectively fast on the shaft 364. These cams 593 and 594 are so constructed that after the type carriers on the rod 291 have been moved out of engagement with their operating gears to their printing line, the tensioned spring 586 is permitted to rock the lever 585 clockwise (Fig. 8) and the lever 580 counter clockwise about their pivots. These rocking movements of the levers 580 and 585 are abruptly arrested by engagement of the arm 584 of the lever 585 with a stud 596 mounted on the frame of the machine. When the lever 580 is abruptly arrested in this manner the momentum of the platen arm 544 causes the latter to be raised still further against the action of the spring 581 so that the platen 543 contacts with the book and carries the card into engagement with the type wheels, this extra step of movement of the platen arm 544 independently of the lever 580 being permitted by the slot and pin connection 578 and 579. The cams 593 and 594 then restore the levers 584 and 580 and platen lever 544 to normal position and then immediately after the card has been fed out of printing position, the spring 586 rocks the levers 584 and 580 as before so that the platen carries the book against the printing wheels.

It is desirable to prevent the platen 543 from striking the ink ribbon and type wheels when no book or card is in the printing carriage, as is the case when a total or sub-total is to be printed only on the detail strip. In order to prevent such contact of the platen with the ink ribbon the following device is employed. Loosely mounted on the shaft 354 (Figs. 7, 8 and 24) is an arm 599 provided with a downwardly extending projection 600 having a recess into which projects a pin 601 mounted on an arm 602, which is fast on a shaft 603, supported by the frames 355 and 286. Rigidly mounted on the shaft 603 are two arms 604 carrying pins 605 near their upper ends. A spring 606 connected at one end to a pin on the arm 602 and at its opposite end to the frame 286 tends to rock the arm 602 clockwise (Figs. 8 and 24) but such movement is normally prevented by the engagement of a pin 607 projecting from the arm 494 of the yoked member 495, with the upper edge of the arm 599. When the yoke 495 is rocked during the operation of the machine, as above described, the pin 607 is raised and the spring 606 rocks the arm 602 until the upper end of the vertically extending portion 608 of the arm 599 contacts with the depositor's book in the carriage. If a book or card is not in the carriage the spring 606 is permitted to rock the arm 602 still further, the movement of the arm in such case being limited by the engagement of the arm with a stud 609 on the frame 286. As the arms 602 and 604 are fast on the shaft 603, the arms 604 are rocked with the arms 602.

The movement of the arms 604 when a card or book is in the carriage is not sufficient to carry the pins 605 on the arms above arms 611 projecting from the platen arm 544, so that the platen is permitted to contact with the book and card upon operation of the platen arm. When a book and card are not in the carriage, however, the arms 604 are rocked sufficiently far to carry the pin 605 above the arms 611 so that when the platen arm is operated it is arrested by the contact of the arms 611 with the pins 605 whereby the platen does not strike the inking ribbon and type carriers. The slot and pin connection 578 and 579 permits the operation of the levers 580 and 584 in the same manner as when the card and book are in the carriage, the pins 605 merely preventing the extra movement of the platen arm due to its momentum.

*Operation.*

Having described in detail the construction and operation of the various parts of the present invention a résumé of its operation will now be given.

When a depositor wishes to deposit or withdraw a sum of money he hands his bank book to the postal clerk or operator and the latter withdraws the corresponding card of the depositor from the files, inserts both the card and book in their proper guideways in the carriage, and shifts the carriage so that the next lines on the book and card under the last printed amount are at the printing line of the type carriers for printing on the book and card. The top and bottom ends of the book, when opened, are slid in the guideways 473 of the carriage and the card is inserted above the book in the guideways formed above the guideways 473. The clerk then sets up the depositor's number on the depositors' keys 74 and the amount withdrawn or deposited on the amount keys 73 and finally depresses the withdrawal or deposit key dependent upon whether the amount is withdrawn or deposited. The depression of the withdrawal or deposit key releases the machine and the driving mechanism upon operation drives the differential units of the various key banks until the differential units are arrested by the depressed keys in the corresponding banks.

During the first one-half operation of the machine the totalizers are shifted under the control of the depressed deposit or withdrawal key bringing the desired totalizer opposite the actuating racks 198. After the actuating racks 198 have been differentially positioned and before they begin their return movement to normal position the selected totalizer is moved into engagement with the actuating racks so that upon return movement of the latter to normal position the amount set up on the amount keys is added on the engaged totalizer.

The various differential units control the positioning of their corresponding type carriers (Fig. 17) through the connections shown in Figs. 7 and 17 and fully described above. After the type carriers for printing on the detail strip have been differentially positioned the platen frame 414 is operated so that the platen roll 408 carries the detail strip against the printing line of the type carriers.

After the type carriers for printing on the depositor's book and card have been differentially positioned the cam 491 (Fig. 11) is operated to rock the lever 488, the sleeve 275 and the arms 292 and 293 to carry the type carriers out of engagement with their operating gears. If the withdrawal key has been depressed the roller 528 is raised into the recess 529 in the bar 530, if the roller is not already in such position, by the operation of the link 521, the arm 522, the shaft 523 and the arm 524 (Fig. 16) by the rack 321. If the deposit key is depressed the roller 528 is moved out of the recess 529 through the above mentioned connections and the rack bar 321, if the roller is not already out of the recess from the machine. When preceding operation of the machine. When the roller 528 is in the recess 529 the reciprocation of the bar 530 through its connections to the shifting cam 514 (Figs. 11, 20 and 21) rocks the latter to shift the amount type carriers 290 to the position shown in Fig. 21, so that these amount type carriers print in the withdrawn amount columns on the depositor's book and card. When the roller 528 is not in the recess 529 the bar 530 is idly reciprocated and the amount type carriers 290 are not shifted and hence the item is printed in the deposit columns on the book and card.

While the type carriers are out of engagement with their operating gears the platen lever 544 is operated twice, as above described. On the first operation the platen 543 engages the under side of the book and the book contacts with the card to carry the latter into printing engagement with the type carriers. Immediately after the type carriers have printed on the card and before the platen is operated a second time, the shaft 469 is given one complete rotation by the mechanism shown in Figs. 1 and 7, whereupon the pairs of feeding rollers 546 and 550 feed the card from under the type carriers so that when the platen is raised a second time it contacts with the book and carries the latter into printing engagement with the type carriers. After the book has been printed upon the cam 514 is first moved to normal position to shift the amount type carriers to their normal position on the rod 291 if the type carriers have been shifted and then the cam 491 is rocked back to normal position to rock the type carriers into normal engagement with the operating gears.

When a total or sub-total is to be printed the total lever 77 is moved to the desired position and through the corresponding connections to the type wheel 283 (Fig. 17) positions the latter to print a character designating whether the amount printed is a total or sub-total. The totals and sub-totals are printed only upon the detail strip, a depositor's book and card not being inserted in the machine upon such operations. As there is no book and card in the carriage on such operations the arm 599 (Figs. 8 and 24) is permitted to rock farther than when arrested by a book or a card in adding operations and therefore the pins 605 on the arms 604 are rocked over the arms 611 on the platen arm 544 to prevent contact of the platen with the type carriers.

The portion of the detail strip shown in Fig. 23 shows the records printed during a day's business or any other period. At the beginning of a day's business the machine is operated with the total lever 77 in its "read" position so that the operator may be sure that the totalizers are standing at zero. The first two records on the portion of the strip shown in Fig. 23, were printed during the first operation in which the withdrawal totalizer was engaged with the actuators. The first record was printed during the first cycle and the second during the second cycle of each operation. The letter "X" after the amounts indicates that the total lever was in its "read" position and the "W" indicates that the withdrawal totalizer was selected. The next two records were printed during the operation in which the deposit totalizer was moved into engagement with the actuators. During the day the amounts deposited and withdrawn are recorded. At any time the total amounts on the totalizers may be printed and these amounts returned on the totalizers. At the end of a day's business the totals on the totalizers are printed. The last four printed records were made during the last two operations of the machine to print the totals. Two records are printed at each operation, no amount being printed during the first cycle and the total being printed during the second cycle of operation. The letter "Z" after the amounts indicates that the amounts are printed totals.

While the form of mechanism herein shown and described is admirably adapted to fulfil the objects primarily stated, it is to be understood that it is not intended to confine the invention to the one form of embodiment herein shown and described, as it is susceptible of embodiment in various forms, all coming within the scope of the claims which follow.

What is claimed is:—

1. In a machine of the class described, the combination with a plurality of type carriers, of a main operating mechanism, mechanism operated by the main operating mechanism for moving said type carriers differentially, manipulative means controlling the extent of movement of the type carriers, and means operated by the main operating mechanism for shifting the type carriers to print in different columns on record material.

2. In a machine of the class described, the combination with a plurality of type carriers, of a main operating mechanism, mechanism for moving said type carriers differentially, manipulative means controlling the extent of movement of the type carriers, a cam operated by the main operating mechanism for shifting said type carriers to print in different columns on record material, and manipulative means controlling the operation of said cam.

3. In a machine of the class described, the combination with a plurality of type carriers, of a main operating mechanism, differential mechanism adapted to actuate said type carriers, manipulative means controlling the extent of movement of the type carriers, a cam operated by the main operating mechanism for shifting said type carriers to print in different columns on record material, and keys controlling the operation of said cam.

4. In a machine of the class described, the combination with a main operating mechanism, of a plurality of type carriers, actuators for the type carriers normally in engagement therewith, means operated by the main operating mechanism for effecting disengagement of the type carriers from the actuators, and means also operated by the main operating mechanism for shifting said type carriers while the latter are out of engagement with the actuators to effect columnar printing.

5. In a machine of the class described, the combination with a main operating mechanism, of a plurality of type carriers normally in printing relation with one column on record material, means for shifting said type carriers to print in another column on the record material, a device operated by said operating mechanism for operating said shifting means, and means for connecting and disconnecting said device and said shifting means.

6. In a machine of the class described, the combination with a main operating mechanism, of a plurality of type carriers normally in printing relation with one column on record material, means for shifting said type carriers to print in another column on the record material, a device operated by said operating mechanism for operating said shifting means, means operated by the main operating mechanism for connecting and disconnecting said device and said shifting means, and manipulative means for controlling said connecting means.

7. In a machine of the class described, the combination with a main operating mechanism, of a plurality of type carriers, a rack operated by the operating mechanism for operating one of said type carriers, manipulative means adapted to control the positioning of the rack, means for shifting said type carriers, and a member operated by the operating mechanism for operating said shifting means; said rack controlling the operation of said shifting means by said member.

8. In a machine of the class described, the combination with a main operating mechanism, of a plurality of totalizers, common actuating means for the totalizers, means operated by the main operating means for selectively moving the totalizers into coöperative relation with the actuating means, a group of type carriers for printing in columns on record material, means for shifting the type carriers into position to print in the column appropriate to the selected totalizer, and common means for selecting the totalizer to be operated and controlling the shifting of the type carriers.

9. In a machine of the class described, the combination with a main operating mechanism, of a plurality of totalizers, common actuating means for the totalizers, means operated by the main operating means for selectively moving the totalizers into coöperative relation with the actuating means, a group of type carriers for printing in columns on record material appropriate to the totalizers, means for shifting the type carriers into position to print in the column appropriate to the selected totalizer, and keys common to said selecting means and said shifting means for controlling the same.

10. In a machine of the class described, the combination with a main operating mechanism, of a plurality of totalizers, common actuators for the totalizers, means operated by the main operating mechanism for moving the totalizers directly from one position to another selectively to bring any one of them into operative relation with the actuators, type carriers, actuators therefor normally in operative relation with the type carriers, means operated by the main operating mechanism for shifting the type carriers to effect columnar printing on record material the columns printed in being appropriate to the selected totalizers, and common means for controlling the totalizer moving means and the type carrier shifting means.

11. In a machine of the class described, the combination with a plurality of type carriers, of differentially movable actuated racks therefor, and means automatically controlled by the rack of highest order moved out of zero position for moving the racks of higher orders one step to eliminate zero printing.

12. In a machine of the class described, the combination with a plurality of type carriers, of actuating racks therefor, segment gears meshing with teeth on the actuating racks for operating the same the segment gears being constructed to permit movement of the racks one step in one direction from zero independently of the segment gears, and means controlled by the rack of highest order moved out of zero position by its segment gear for moving the racks of higher orders one step independently of the segment gears to eliminate zero printing.

13. In a machine of the class described, the combination with a plurality of type carriers, of actuating racks therefor, segment gears meshing with teeth on the actuating racks for operating the same the segment gears being constructed to permit movement of the racks one step in one direction from zero independently of the segment gears, and means controlled by the rack of highest order moved out of zero position by its segment gear for moving the racks of higher orders one step independently of the segment gears to eliminate zero printing, the racks and the segment gears being so constructed that the latter are positively locked against movement by the racks when the racks have been operated to eliminate the printing of zeros by the corresponding type carriers.

14. In a machine of the class described, the combination with a plurality of type carriers, of actuating racks therefor, means for positively operating said actuating racks, and means automatically controlled by the rack of highest order moved out of zero position for moving the racks of higher orders one step to eliminate zero printing.

15. In a machine of the class described, the combination with a main operating mechanism, of a plurality of type carriers, actuating racks for the type carriers moved differentially by the operating mechanism, pawls one for each rack, means for operating said pawls the pawls being constructed so that the rack of highest order moved out of zero position permits the pawls for the racks of higher orders to be connected with their racks whereby these latter racks and their type carriers are moved one step to eliminate zero printing.

16. In a machine of the class described, the combination with a main operating mechanism, of means normally locking the same against operation, manipulative means for rendering said locking means ineffective, printing mechanism comprising means for printing on a detail strip and means for feeding the detail strip, and means controlled by said detail strip for locking said manipulative means against operation when said detail strip is exhausted.

17. In a machine of the class described, the combination with a main operating mechanism, of a device normally locking the same against operation, a bank of keys operation of which renders said locking device ineffective, a plate operated by depression of said keys, an arm connected to said plate, a locking member normally out of engagement with said arm, printing means for printing on a detail strip, and means automatically moved when the record strip is exhausted to permit said locking member to move into engagement with said arm for the purpose of locking said keys against operation.

18. In a machine of the class described, the combination with printing means for printing on record material, of a platen for carrying said material into engagement with said printing means, an arm moved into engagement with said record material before said platen, and means operated by said arm when no record material is present for preventing contact of said platen with the printing means.

19. In a machine of the class described, the combination with printing means for printing on record material, of a platen for carrying said material into engagement with said printing means, a member having a slot and pin and spring connection with said platen for operating the latter, an arm moved into engagement with the record material before the platen, and means operated by said arm when no record material is present for limiting movement of said platen to prevent contact of the latter with the printing means.

20. In a machine of the class described, the combination with printing means for printing on record material, of a platen for carrying said material into engagement with the printing means, means for operating said platen, a spring operated arm adapted to be moved into engagement with the record material before the platen, means normally preventing operation of said arm and operated to permit the arm to move into engagement with the record material, and means operated by said arm when no record material is present to prevent contact of the platen with the printing means.

21. In a machine of the class described, the combination with recording means for recording on record material, of a platen for carrying said record material into engagement with the recording means, a member given an invariable extent of movement for operating said platen, a flexible connection between the platen and said member, means moved into engagement with said record material and adapted to limit the movement of the platen when no record material is present to prevent contact of the platen with the recording means.

22. In a machine of the class described, the combination with a movable frame constructed to carry a card and a book the card being placed above the book, of printing means for recording on the card and the book, impression means for first carrying the card and then the book against the printing means, and means for removing the card before the book is carried against the printing means.

23. In a machine of the class described, the combination with a carriage constructed to carry a card and a book the card being placed above the book, of printing means for recording on the card and the book, impression means for first carrying the card and then the book against the printing means, means for removing the card before the book is carried against the printing means, and means upon which the carriage is adapted to be shifted to print in desired lines.

24. In a machine of the class described, the combination with a shiftable carriage for carrying record material, of a rotatable shaft, rollers shiftable with the carriage and mounted on the shaft to rotate therewith, and means for rotating the shaft and rollers to eject the record material from printing position on the carriage.

25. In a machine of the class described, the combination with a shiftable carriage for carrying record material, of a rotatable shaft, rollers shiftable with the carriage and mounted on the shaft to rotate therewith, means for rotating the shaft and rollers to eject the record material from printing position on the carriage, rollers carried by said carriage and normally engaging with said rollers on said shaft, and means for separating the rollers to permit insertion of the record material on the carriage.

26. In a machine of the class described, the combination with a plurality of type carriers, of a main operating mechanism, mechanism operated by the main operating mechanism for moving said type carriers differentially, manipulative means controlling the extent of movement of the type carriers, and means for shifting the type carriers to print in different columns on record material.

27. In a machine of the class described, the combination with a plurality of type carriers, of a main operating mechanism, mechanism for moving said type carriers differentially, manipulative means controlling the extent of movement of the type carriers, a cam for shifting said type carriers to print in different columns on record material, and manipulative means controlling the operation of said cam.

28. In a machine of the class described, the combination with a plurality of type carriers, of a main operating mechanism, differential mechanism adapted to actuate said type carriers, manipulative means controlling the extent of movement of the type carriers, a cam for shifting said type carriers to print in different columns on record material, and keys controlling the operation of said cam.

29. In a machine of the class described, the combination with a main operating mechanism, of a plurality of type carriers normally in printing relation with one column on record material, means for shifting said type carriers to print in another column on the record material, a device for operating said shifting means, and means for connecting and disconnecting said device and said shifting means.

30. In a machine of the class described, the combination with a main operating mechanism, of a plurality of type carriers normally in printing relation with one column on record material, means for shifting said type carriers to print in another column on the record material, a device for operating said shifting means, means for connecting and disconnecting said device and said shifting means, and manipulative means for controlling said connecting means.

31. In a machine of the class described, the combination with a plurality of non-accumulating accounting elements, of a main operating mechanism, mechanism operated by the main operating mechanism for moving said non-accumulating accounting elements differentially, manipulative means controlling the extent of movement of the non-accumulating accounting elements, and means for shifting the non-accumulating accounting elements in different columnar positions.

32. In a machine of the class described, the combination with a plurality of non-accumulating accounting elements, of mechanism for moving said non-accumulating accounting elements differentially, manipulative means controlling the extent of movement of the non-accumulating accounting elements, a cam for shifting said non-accumulating accounting elements to different columnar positions, and manipulative means controlling the operation of said cam.

33. In a machine of the class described, the combination with a plurality of non-accumulating accounting elements, of differential mechanism adapted to actuate the said non-accumulating accounting elements, manipulative means controlling the extent of movement of said non-accumulating accounting elements, a cam for shifting said non-accumulating accounting elements to different columnar positions, and keys controlling the operation of said cam.

34. In a machine of the class described, the combination with a main operating mechanism, of a plurality of non-accumulating accounting elements normally in one columnar position, means for shifting said non-accumulating accounting elements into a different columnar position, a device for operating said shifting means, and means for connecting and disconnecting said device and said shifting means.

35. In a machine of the class described, the combination with a main operating mechanism, of a plurality of non-accumulating accounting elements normally in one columnar position, means for shifting said non-accumulating accounting elements into a different columnar position, a device for operating said shifting means, means for connecting and disconnecting said device and said shifting means, and manipulative means for controlling said connecting means.

36. In a machine of the class described, the combination with a plurality of non-accumulating accounting elements, of a main operating mechanism, mechanism operated by the main operating mechanism for moving said non-accumulating accounting elements differentially, manipulative means controlling the extent of movement of the non-accumulating accounting elements, and means operated by the main operating mechanism for shifting the non-accumulating accounting elements to different columnar positions.

37. In a machine of the class described, the combination with a main operating mechanism, of a plurality of non-accumulating accounting elements, actuators for the non-accumulating accounting elements, normally in engagement therewith, means operated by the main operating mechanism for effecting disengagement of the non-accumulating accounting elements from the actuators, and means also operated by the main operated mechanism for shifting said non-accumulating accounting elements while the latter are out of engagement with the actuators to effect one columnar position.

38. In a machine of the class described, the combination with a main operating mechanism, of a plurality of non-accumulating accounting elements, a rack operated by the operating mechanism for operating one of said non-accumulating accounting elements, a manipulative means adapted to control the position of the rack, means for positioning the non-accumulating accounting elements, one member operated by the operating mechanism for operating said shifting means, and said rack controlling the operation of the said shifting means by said member.

39. In a machine of the class described, the combination with a plurality of type carriers, a main operating device, manipulative devices, mechanism operated by the main operating device for moving said type carriers differentially under the control of certain of said manipulative devices, and means under others of said manipulative devices for shifting the type carriers to print in different columns on the record material according to the differential movement of said type carriers.

40. In a machine of the class described, the combination with a plurality of type carriers, of a main operating device, a plurality of manipulative devices, mechanism operated by the main operating device under the control of certain of said manipulative devices for moving said type carriers differentially, and means also operated by the main operating device and under the control of others of said manipulative devices for shifting the type carriers to print in different columns on record material according to the differential movement given to said type carriers.

41. In a machine of the class described, the combination with a plurality of type carriers, of a main operating device, mechanism operated by the main operating device for moving said type carriers differentially, manipulative means controlling the extent of movement of said type carriers, and means operated by the main operating device for shifting the type carriers to print in different columns on the record material after said type carriers have been moved differentially.

42. In a machine of the class described, the combination with a plurality of accumulating elements adjustable singly and differentially to represent any desired amount, said accumulating elements being further movable as a group to be brought to different effective positions, of a main operating device, mechanism operated by the main operating device for adjusting said accounting elements differentially, and means also operated by the said main operating device for moving said accounting elements as a group to any desired effective position.

43. In a machine of the class described, the combination with a plurality of accumulating elements adjustable differentially, said accumulating elements being further movable as a group to be brought to different effective positions, of a main operating device, of manipulative means of one class, mechanism operated by the main operating device under the control of said manipulative means for adjusting said accounting elements differentially, manipulative means of a different class, and means also operated by said main operating device under the control of said last mentioned manipulative devices for moving said accounting elements as a group to any desired effective position.

44. In a machine of the class described, the combination with manipulative means of different classes, of a plurality of accumulating elements adjustable differentially, said accumulating elements being further movable as a group to be brought to different effective positions, means under the control of manipulative means of one class for adjusting the said accounting elements differentially, and means under the control of the manipulative means of another class for moving said accounting elements as a group to any desired effective position.

45. In a machine of the class described, the combination with a plurality of type carriers, of a main operating device, of manipulative mechanism of different classes, mechanism operated by the main operating device under the control of the manipulative devices of one class for moving said type carriers differentially, and means also operated by the main operating device and under the control of manipulative devices of another class for shifting the type carriers to print in different columns on record material according to the differential movement given to said type carriers, and means for taking an impression from said type carriers.

In testimony whereof I affix my signature.

FREDERICK L. FULLER.